(12) United States Patent
Stenneth et al.

(10) Patent No.: US 12,416,512 B2
(45) Date of Patent: Sep. 16, 2025

(54) METHOD, APPARATUS, AND SYSTEM FOR TRAFFIC INCIDENT VERIFICATION

(71) Applicant: HERE Global B.V., Eindhoven (NL)

(72) Inventors: Leon Stenneth, Chicago, IL (US); Alex Averbuch, Buffalo Grove, IL (US); Advait Mohan Raut, MH (IN); Bruce Bernhardt, Wauconda, IL (US); Jingwei Xu, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 402 days.

(21) Appl. No.: 18/109,052

(22) Filed: Feb. 13, 2023

(65) Prior Publication Data
US 2024/0271962 A1 Aug. 15, 2024

(51) Int. Cl.
G01C 21/00 (2006.01)
(52) U.S. Cl.
CPC ..... *G01C 21/3889* (2020.08); *G01C 21/3867* (2020.08); *G01C 21/387* (2020.08)
(58) Field of Classification Search
CPC ............. G01C 21/3889; G01C 21/387; G01C 21/3867
See application file for complete search history.

(56) References Cited

U.S. PATENT DOCUMENTS

| 9,141,107 B2 | 9/2015 | Ferguson et al. |
| 9,221,461 B2 | 12/2015 | Ferguson et al. |
| 10,643,463 B2 | 5/2020 | Thelen et al. |
| 2019/0362159 A1 | 11/2019 | Cooley |
| 2020/0191602 A1 | 6/2020 | Zhang et al. |

OTHER PUBLICATIONS

Osama ElSahly, A Systematic Review of Traffic Incident Detection Algorithms, https://www.mdpi.com/2071-1050/14/22/14859 (Year: 2022).*
Emere Arco, Andrea Ajmar, Fabrizio Arneodo & Piero Boccardo, An operational framework to integrate traffic message channel (TMC)in emergency mapping services (EMS), https://www.tandfonline.com/doi/full/10.1080/22797254.2017.1361306#abstract, (Year: 2017).*

* cited by examiner

*Primary Examiner* — Aryan E Weisenfeld
(74) *Attorney, Agent, or Firm* — Ditthavong, Steiner & Mlotkowski

(57) ABSTRACT

An approach for traffic incident verification involves receiving a traffic message channel (TMC) message indicating a traffic incident. The TMC message indicates an extent of the traffic incident in a road graph using TMC location code(s)/offset(s). The approach also involves matching the TMC location code(s)/offset(s) to a first set of map road link(s) and offset(s) of a geographic database, determining sensor data collected from vehicle(s) travelling within the road graph. The sensor data indicates the extent as location point(s) of topology segment(s) (TSs) and TS offset(s), matching the location point(s) of the TS(s) and TS offset(s) to a second set of map road link(s) and offset(s) of the geographic database, determining an intersection set between the first and second sets, and initiating a confirmation of the traffic incident reported in the TMC message based on the sensor data of the location point(s) of the TSs in the intersection set.

20 Claims, 14 Drawing Sheets

| TRAFFIC INCIDENT OBSERVATIONS | LatT, LonT | 241 | TSR LATITUDE AND LONGITUDE |
| --- | --- | --- | --- |
| | HT | 243 | TIO HEADING |
| RMOB LINK | L | 245 | LINK ID |
| | FC | 247 | FUNCTIONAL CLASS OF THE LINK, RANGE FROM 1 TO 5 |
| | LatU, LonU | 249 | UPSTREAM NODE LATITUDE AND LONGITUDE |
| | LatD, LonD | 251 | DOWNSTREAM NODE LATITUDE AND LONGITUDE |
| RMOB SHAPE | LatS$_i$, LonS$_i$ | 253 | SHAPE POINT LATITUDE AND LONGITUDE. i IS THE SEQUENCE NUMBER FOR THE SHAPE POINTS WHICH START FROM 1. THE SMALLER i IS, THE CLOSER THE SHAPE POINT IS TO THE UPSTREAM NODE. |

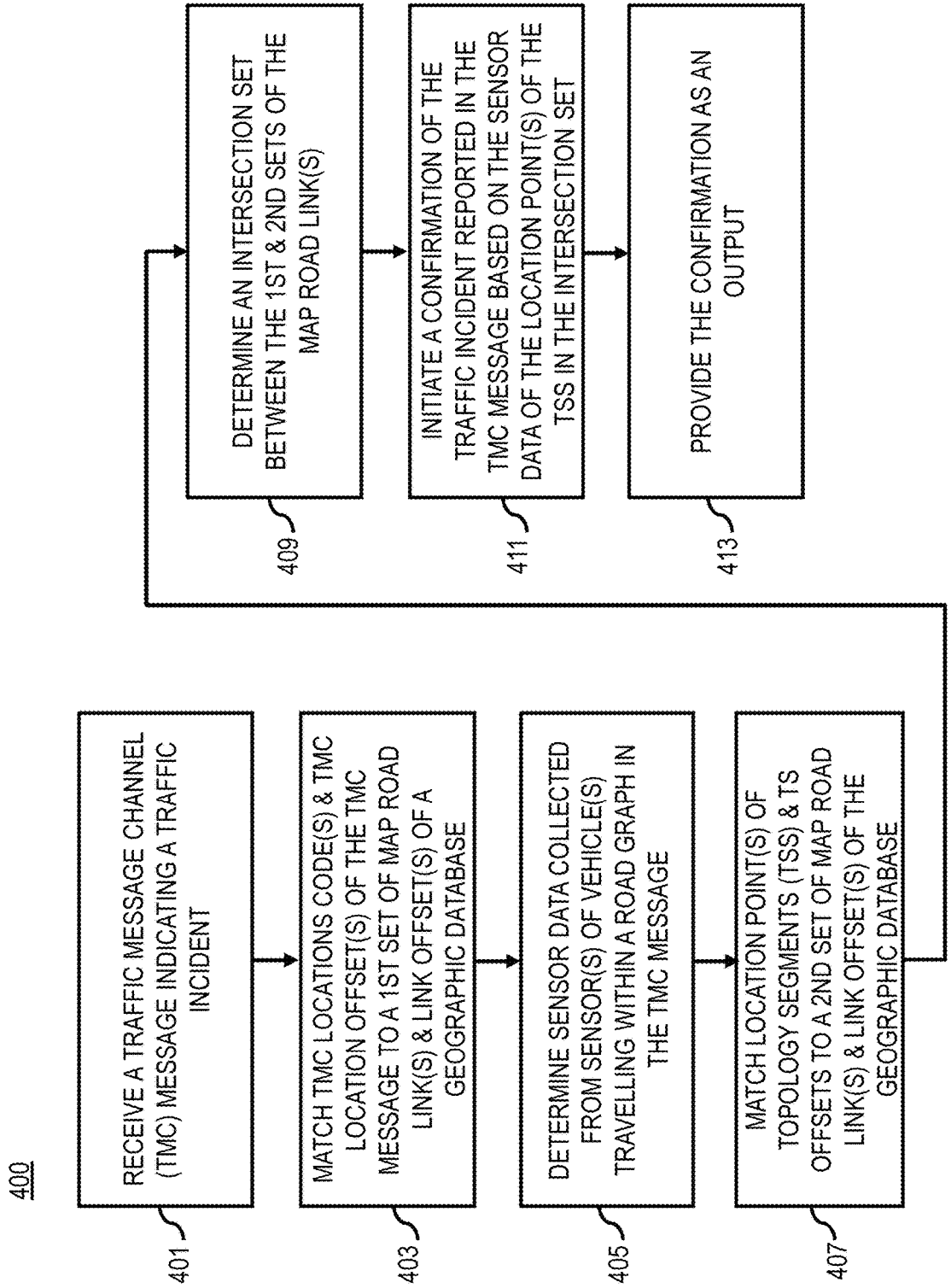

METHOD, APPARATUS, AND SYSTEM FOR TRAFFIC INCIDENT VERIFICATION

BACKGROUND

Navigation and mapping service providers are continually challenged to provide digital maps with road incident reports to support advanced applications such as autonomous driving. For example, providing users and/or vehicle up-to-date data on traffic flow and road incidents (e.g., accidents, road work areas, etc.) can potentially reduce congestion and improve safety. However, road incident information reported from third parties in various location referencing schemes (e.g., Traffic Message Channel messages) that come with different advantages and disadvantages. For instance, the roadwork events sourced from third parties are normally with high coverage but inaccurate in terms of start location, end location, start time and end time. To verify the roadworks events that are soured from third parties, some systems apply real time sensor data (e.g., image data of lane markings on a roadwork link) from consumer vehicles, and directly compare these two sets of data with very different location referencing schemes. Therefore, service providers face significant technical challenges to directly compare road incident report data with very different location referencing schemes thereby verifying road incident reporting accuracy and efficiency that support autonomous driving, etc.

SOME EXAMPLE EMBODIMENTS

Therefore, there is a need for traffic incident verification via fusion of a location referencing scheme (e.g., TMC messages) with vehicle sensor data, for example, using a node/link representation as a translation layer.

According to example embodiment(s), a method comprises receiving at least one traffic message channel (TMC) message indicating a traffic incident. The at least one TMC message indicates an extent of the traffic incident in a road graph using one or more TMC location codes and one or more TMC location offsets. The method also comprises matching the one or more TMC locations codes and the one or more TMC location offsets to a first set of one or more map road links and one or more link offsets of a geographic database. The method further comprises determining sensor data collected from one or more sensors of one or more vehicles travelling within the road graph. The sensor data indicates the extent as one or more location points of one or more topology segments (TSs) and one or more TS offsets. The method further comprises matching the one or more location points of the one or more TSs and TS offsets to a second set of one or more map road links and one or more link offsets of the geographic database. The method further comprises determining an intersection set between the first and second sets of the one or more map road links. The method further comprises initiating a confirmation of the traffic incident reported in the at least one TMC message based on the sensor data of the one or more location points of the one or more TSs in the intersection set. The method further comprises providing the confirmation as an output.

According to another embodiment, an apparatus comprises at least one processor, and at least one memory including computer program code for one or more computer programs, the at least one memory and the computer program code configured to, with the at least one processor, cause, at least in part, the apparatus to receive at least one traffic message channel (TMC) message indicating a traffic incident. The at least one TMC message indicates an extent of the traffic incident in a road graph using one or more TMC location codes and one or more TMC location offsets. The apparatus is also caused to match the one or more TMC locations codes and the one or more TMC location offsets to a first set of one or more map road links and one or more link offsets of a geographic database. The apparatus is further caused to determine sensor data collected from one or more sensors of one or more vehicles travelling within the road graph. The sensor data indicates the extent as one or more location points of one or more topology segments (TSs) and one or more TS offsets. The apparatus is further caused to match the one or more location points of the one or more TSs and TS offsets to a second set of one or more map road links and one or more link offsets of the geographic database. The apparatus is further caused to determine an intersection set between the first and second sets of the one or more map road links. The apparatus is further caused to initiate a confirmation of the traffic incident reported in the at least one TMC message based on the sensor data of the one or more location points of the one or more TSs in the intersection set. The apparatus is further caused to provide the confirmation as an output.

According to another embodiment, a computer-readable storage medium carries one or more sequences of one or more instructions which, when executed by one or more processors, cause, at least in part, an apparatus to receive at least one traffic message channel (TMC) message indicating a traffic incident. The at least one TMC message indicates an extent of the traffic incident in a road graph using one or more TMC location codes and one or more TMC location offsets. The apparatus is also caused to match the one or more TMC locations codes and the one or more TMC location offsets to a first set of one or more map road links and one or more link offsets of a geographic database. The apparatus is further caused to determine sensor data collected from one or more sensors of one or more vehicles travelling within the road graph. The sensor data indicates the extent as one or more location points of one or more topology segments (TSs) and one or more TS offsets. The apparatus is further caused to match the one or more location points of the one or more TSs and TS offsets to a second set of one or more map road links and one or more link offsets of the geographic database. The apparatus is further caused to determine an intersection set between the first and second sets of the one or more map road links. The apparatus is further caused to initiate a confirmation of the traffic incident reported in the at least one TMC message based on the sensor data of the one or more location points of the one or more TSs in the intersection set. The apparatus is further caused to provide the confirmation as an output.

According to another embodiment, a computer program product may be provided. For example, a computer program product comprising instructions which, when the program is executed by a computer, cause the computer to receive at least one traffic message channel (TMC) message indicating a traffic incident. The at least one TMC message indicates an extent of the traffic incident in a road graph using one or more TMC location codes and one or more TMC location offsets. The computer is also caused to match the one or more TMC locations codes and the one or more TMC location offsets to a first set of one or more map road links and one or more link offsets of a geographic database. The computer is further caused to determine sensor data collected from one or more sensors of one or more vehicles travelling within the road graph. The sensor data indicates the extent as one or more location points of one or more topology segments (TSs) and one or more TS offsets. The computer is further caused to match the one or more location points of the one or more TSs and TS offsets to a second set of one or more map road links and one or more link offsets of the geographic database. The computer is further caused to determine an intersection set between the first and second sets of the one or more map road links. The computer is further caused to initiate a confirmation of the traffic incident reported in the at least one TMC message based on the sensor data of the one or more location points of the one or more TSs in the intersection set. The computer is further caused to provide the confirmation as an output.

According to another embodiment, an apparatus comprises means for receiving at least one traffic message channel (TMC) message indicating a traffic incident. The at least one TMC message indicates an extent of the traffic incident in a road graph using one or more TMC location codes and one or more TMC location offsets. The apparatus also comprises means for matching the one or more TMC locations codes and the one or more TMC location offsets to a first set of one or more map road links and one or more link offsets of a geographic database. The apparatus further comprises means for determining sensor data collected from one or more sensors of one or more vehicles travelling within the road graph. The sensor data indicates the extent as one or more location points of one or more topology segments (TSs) and one or more TS offsets. The apparatus further comprises means for matching the one or more location points of the one or more TSs and TS offsets to a second set of one or more map road links and one or more link offsets of the geographic database. The apparatus further comprises means for determining an intersection set between the first and second sets of the one or more map road links. The apparatus further comprises means for initiating a confirmation of the traffic incident reported in the at least one TMC message based on the sensor data of the one or more location points of the one or more TSs in the intersection set. The apparatus further comprises means for providing the confirmation as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2C illustrates a diagram of a data record of a RMOB link stored in a map database, according to example embodiment(s);

FIG. 4 is a flowchart of a process for providing traffic incident verification via fusion of a location referencing scheme (e.g., TMC specification) and vehicle sensor data, according to example embodiment(s);

DESCRIPTION OF SOME EMBODIMENTS

Examples of a method, apparatus, and computer program for traffic incident verification via fusion of a location referencing scheme (e.g., TMC specification) and vehicle sensor data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

It is noted that the term "traffic incident" refers to any occurrence on a roadway that impedes normal traffic flow. For instances, traffic incidents include any recurring or non-recurring events that cause a reduction of roadway capacity or an abnormal increase in demand, such as roadworks, traffic crashes, disabled vehicles, spilled cargo, highway maintenance and reconstruction projects, special non-emergency events (e.g., ball games, concerts, or any other event that significantly affects roadway operations), etc.

As used herein, the term roadwork refers to work done in constructing or repairing roads, and the term roadwork zone refers to an area where roadwork takes place. Roadwork zones include mobile roadwork zones such as areas of roadway striping, pothole filling, tree trimming, etc. A roadwork zone can be marked by signs, channeling devices, barriers (e.g., traffic cones), pavement markings, and/or work vehicles. For instance, highway work zones can be set up according to the type of road and the work to be done on the road. The roadwork zone can be long or short term and can exist at any time of the year.

Although various embodiments are described with respect to roadwork zones, it is contemplated that the approaches of the various embodiments described herein are applicable to other traffic incidents that are external to vehicles and detectible by vehicle sensors, such as an car accident event, a congestion event, a road hazard (e.g., oil spill, unplowed road, fog, hail, flood, ice, etc.) event, a police presence event, etc.

Although various embodiments are described with respect to TMC messages, it is contemplated that the approaches of the various embodiments described herein are applicable to other location referencing schemes, such as OpenLR Location Referencing (OLR), universal location referencing (ULR), geographic location referencing (GLR), or other similar location refereeing schemes designed to describe a section or point on a road.

Figure 1:
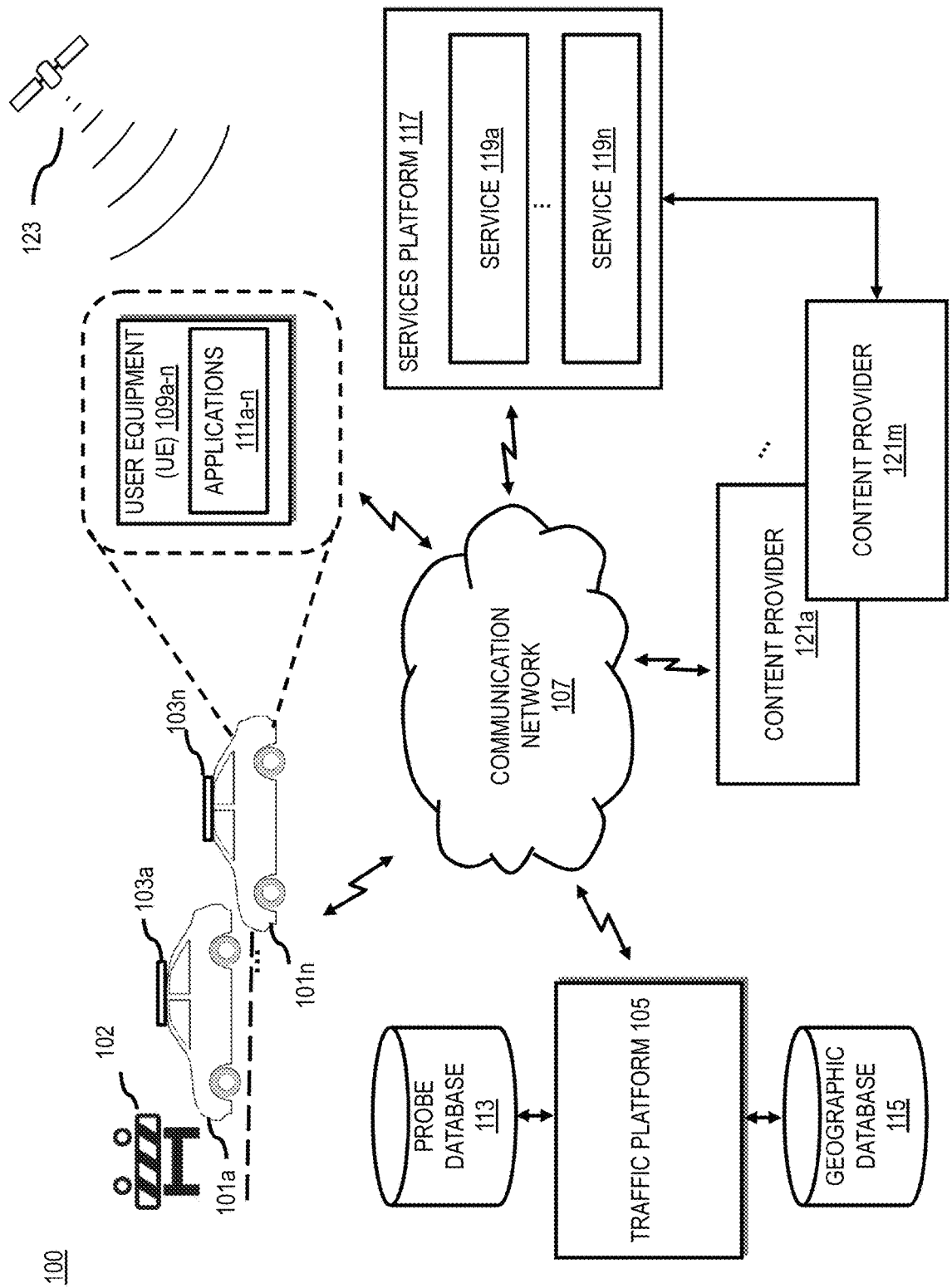
FIG. 1 is a diagram of a system capable of traffic incident verification via fusion of a location referencing scheme (e.g., TMC specification) and vehicle sensor data, according to example embodiment(s)

FIG. 1 is a diagram of a system capable of traffic incident verification via fusion of a location referencing scheme (e.g., TMC specification) and vehicle sensor data (i.e., from predefined road segments), according to example embodiment(s). Providing autonomous or semi-autonomous vehicles with up-to-date data on traffic incidents can reduce congestion and improve safety on the road network. Traffic service providers report real-time incidents on a specific road segment and send warning messages to vehicles driving upstream ahead of incidents based on multiple input resources (e.g., regulators such as California Department of Transportation, service providers such as GEWI Europe based in Germany, local or community resources, etc.) using various location referencing schemes. A location reference infers a scheme to describe a location on earth, such as by geographic features like a road, building, park, driving route, flooding area, etc. By way of example, the TMC (Traffic Message Channel) displays traffic information such as traffic congestion, accidents, and roadworks on the map screens by receiving FM multiplex broadcasting via communications networks. In general, TMC codes (e.g., ISO 17572 series) references a node at intersection of a road network or a boundary between two road segments.

In addition to TMC location referencing scheme, the Transport Protocol Experts Group (TPEG) develops methods of universal location referencing (ULR), geographic location referencing (GLR), OpenLR location referencing (OLR), etc. (in e.g., ISO 18234 and IS21219 series) for location referencing based on geo-coordinates (e.g., World Geodetic System 1984 (WGS84)), along with supplementary information like bearing, function of road class and other attributes for better location encoding and decoding performance on digital maps using map matching techniques to support automotive applications. These approaches are designed to make the solutions map-agnostic. Unlike TMC which is a predefined location reference scheme shared through a TMC table across all digital map or traffic service providers, ULR, GLR, OLR target map independent location references based on different location reference generation rules.

However, these location referencing schemes were not designed to support the newer highly automated applications or autonomous driving applications, and each location referencing scheme has its own advantages and disadvantages. For instance, TMC covers mainly freeway and priority arterials. In addition, TMC codes are defined based on road segments instead of lane usages such that special use lanes and regular lanes share the same TMC code. In many scenarios, a TMC is unable to differentiate special use lanes (e.g., high-occupancy-vehicle (HOV) lanes, high-occupancy-toll (HOT) lanes, reversible lanes, etc) from regular lanes. As a result, it is difficult to deliver lane-level traffic information based only on the TMC location referencing scheme. Moreover, since the TMC code table is shared across map and traffic service providers and infrequently updated (e.g., months) to include new and improved roadways, it is difficult to align TMC location reference with high definition (HD) mapping data that provide centimeter-level or better accuracy of map features to meet the requirements of autonomous driving applications.

On the other hand, OLR, ULR, GLR, etc. overcome some shortcomings of TMC coverage issues based on location coordinates of the WGS84 reference system targeting the independence of digital maps from encoder and decoders limitations, yet susceptible to GPS resolution errors (e.g., 1-3 meters), encoder and decoder digit representation errors, etc. For example, OLR can calculate a 24-bit integer representation which leads to a coordinate resolution ("error") of approximately 2.4 meter, such that the encoder and the decoder can use different maps thus causing map-matching issues for location referencing.

Accordingly, mapping service providers face significant technical challenges to improve the location referencing schemes for better road incident reporting accuracy and efficiency that support autonomous driving, etc.

To address these problems, the system 100 of FIG. 1 introduces a capability to provide traffic incident verification via fusion of a location referencing scheme (e.g., TMC specification) and vehicle sensor data collected by one or more vehicles 101a-101n (also collectively referred to as vehicles 101) (e.g., autonomous vehicles, HAD vehicles, semi-autonomous vehicles, etc.), using a node/link representation as a translation layer.

Taking a roadwork 102 as a traffic incident example, it has start and end points in a road graph that models a road network. Edges/arcs in the road graph represent roads, and vertices/nodes are intersections where roads meet. The road graph is directed, but usually symmetric (most roads allow for two-way travel). Therefore, one-dimensional locations of the start and end points with a possible path between them can be specified to define the location of the roadwork 102. Standard TMC message(s) include spatial TMC location codes plus TMC location offsets within the TMC message of both starting and ending points of a traffic incident extent. When the roadwork 102 spreads over more than one TMC message, the roadwork 102 can reported via TMC messages.

A Radio Data System-Traffic Message Channel (RDS-TMC) message can identify a specific location/section of the road network for traffic messaging purposes, and communicate the information to drivers/vehicles. The RDS-TMC codes are typically used in conjunction with the corresponding traffic tables. Table 1 lists attributes of a RDS-TMC message.

sages are compared by the receiver for validity; and messages are accepted as valid only after they have been identically received several times. The system is also designed to prioritize messages according to currency and urgency status.

In one embodiment, the system 100 can verify TMC messages against vehicle sensor data points. The system 100 can process the vehicle sensor data points (e.g., probe point trajectories) to build a possible route/topology of the roadwork 102, and splits the route into sections of a predetermined length (e.g., 50 meters). For each segment, the system 100 can calculate a probability of the roadwork 102 and confidence. As opposed to TMC messages (e.g., TMC1, TMC2), one-dimensional coordinates for each section including topology segments (TSs), such as TS1, TS2, TS3, TS4, as well as start and end offsets within the topology segment(s) of each section.

Figure 2A:
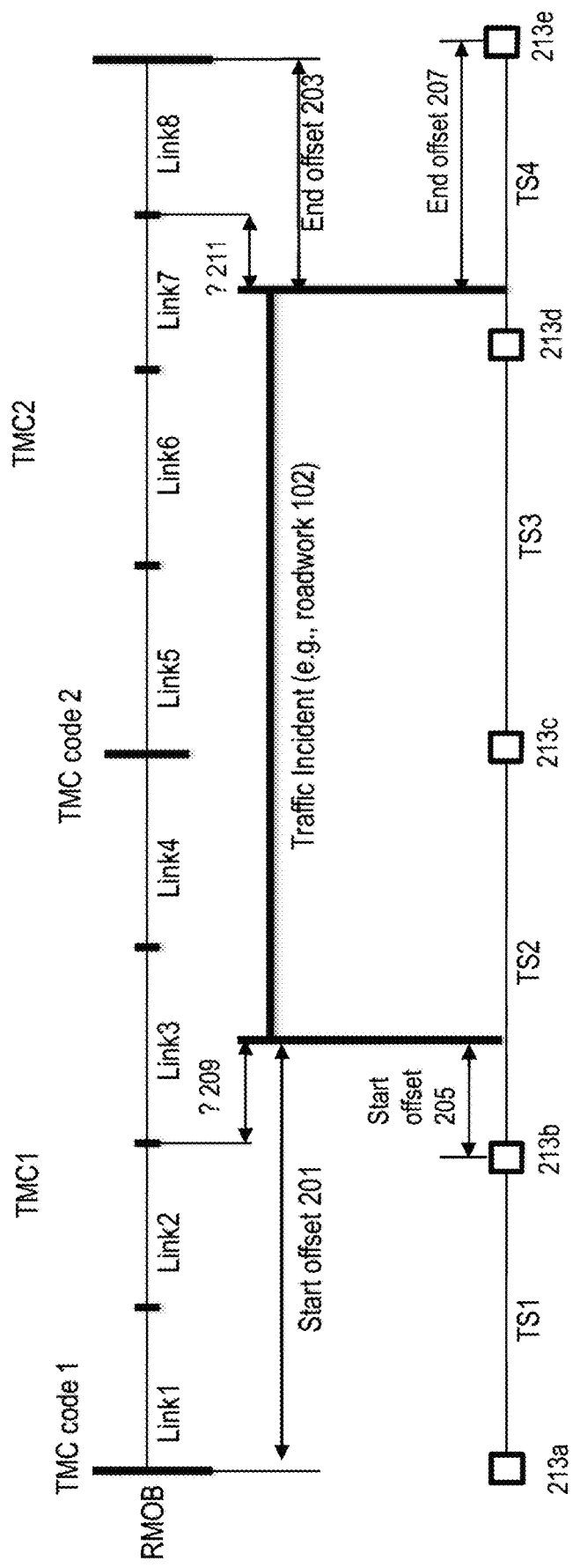
FIG. 2A is a diagram of a TMC-Link-TS mapping example, according to example embodiment(s)

FIG. 2A is a diagram of a TMC-Link-TS mapping example, according to example embodiment(s). In FIG. 2A, the roadwork 102 can be reported in both TMC1 message including TMC, and TMC2 message including TMC location codes TMC code 1, TMC code 2, and TMC location offsets: TMC start offset 201, TMC end offset 203. In particular, an extent of the roadwork 102 is defined by the TMC start offset 201 from the start point of the TMC1 message, and the TMC end offset 203 from the end point of the TMC2 message. On the other hand, the roadwork 102 can be reported as in a TS section that includes topology segments TS2, TS3, TS4. In FIG. 2A, the topology segments TS1, TS2, TS3, TS4 are defined by TS location points 213a, 213b, 213c, 213d, 213e (e.g., 50-meter apart). In particular, the roadwork 102 has a TS start offset 205 from the start point of the TS2 of the TS section, and a TS end offset 207 from the end point of the TS4 of the TS section. In FIG. 2A,

TABLE 1

| Attribute | Type | Label | Description |
|---|---|---|---|
| location_code | uint32 | | Up to 5 digit identifier of the problem location. |
| location_disposition | string | | Indicates disposition of the specific incident relative to the location. EXTERNAL_POSITIVE_DIRECTION: Towards the next location. Mapped from "+". EXTERNAL_NEGATIVE_DIRECTION: Towards the previous location. Mapped from "−". INTERNAL_POSITIVE_DIRECTION: Towards the next location. Mapped from "P". INTERNAL_NEGATIVE_DIRECTION: Towards the previous location. Mapped from "N". |
| location_table_number | uint32 | | 2 digit identifier of the problem location code definition table. |
| ebu_country_code | string | | A single character country code. Note 1 = USA, C = Canada. |
| segment_identifier | string | | An identifier for the referenced segment in the format of domain:system:type:id, for example, "here:cm:segment: 532172642". This property is unique in a catalog. |
| segment_start_offset | double | | Values range from [0.0-1.0]. Relative to the segment's orientation - not necessarily the overall chain orientation. |
| segment_end_offset | double | | Values range from [0.0-1.0]. Relative to the segment's orientation - not necessarily the overall chain orientation. |
| segment_inverted | bool | | The referenced segment is inverted in relation to the chain. |
| attribute_orientation | string | | The attribute's orientation relative to the chain's first-to-last orientation. |
| partition_name | string | | Quadkey for the current partition. |

A location code can contain information of a geographic location of a problem (country, state, county, city), a name of highway or route number, a segment of highway or mileage number, a point address that would help pinpoint the problem site, status Information (e.g., journey/link time, speed, delay, headway etc.

TMC messages are designed to be repetitive to help verify the validity of the received messages. The repeated mesthe TS scheme can more accurately define the extent of the roadwork 102 than the TMC scheme.

In one embodiment, the system 100 can verify the roadwork 102 referenced in the TMC scheme against the roadwork 102 referenced in the TS scheme, by translating the TMC location reference and the TS location reference respectively into a common node/link representation: relational map object base (RMOB) Link 1, Link 2, Link 3, Link 4, Link 5, Link 6, Link 7, Link 8 in FIG. 2A. Because the units used in TMC and TS location referencing schemes are different, the units need to be converted into a common denominator. In one embodiment, the system 100 choose to convert TMC or TS location references into an optimized map for location library (OMLL) vertices (reference resolution) and then creating location references from the OMLL vertices (reference creation). The OMLL contains a simplified representation of vertex value ranges comprising a property value as well as a start and end fraction along a single vertex's length. This allows attaching a particular property value to only parts of a vertex yet eliminates the complexity caused by multi-vertex or even multi-partition ranges.

Using OMLL vertices is more efficient to analyze properties of a given road segment than TMC links or topology segments. The mapping layer of the OMLL defines a mapping between vertices in the routing graph and the TSs. For instance, the OMLL vertices can define RMOB links in a map database as depicted in FIGS. 2B-2C.

Figure 2B:
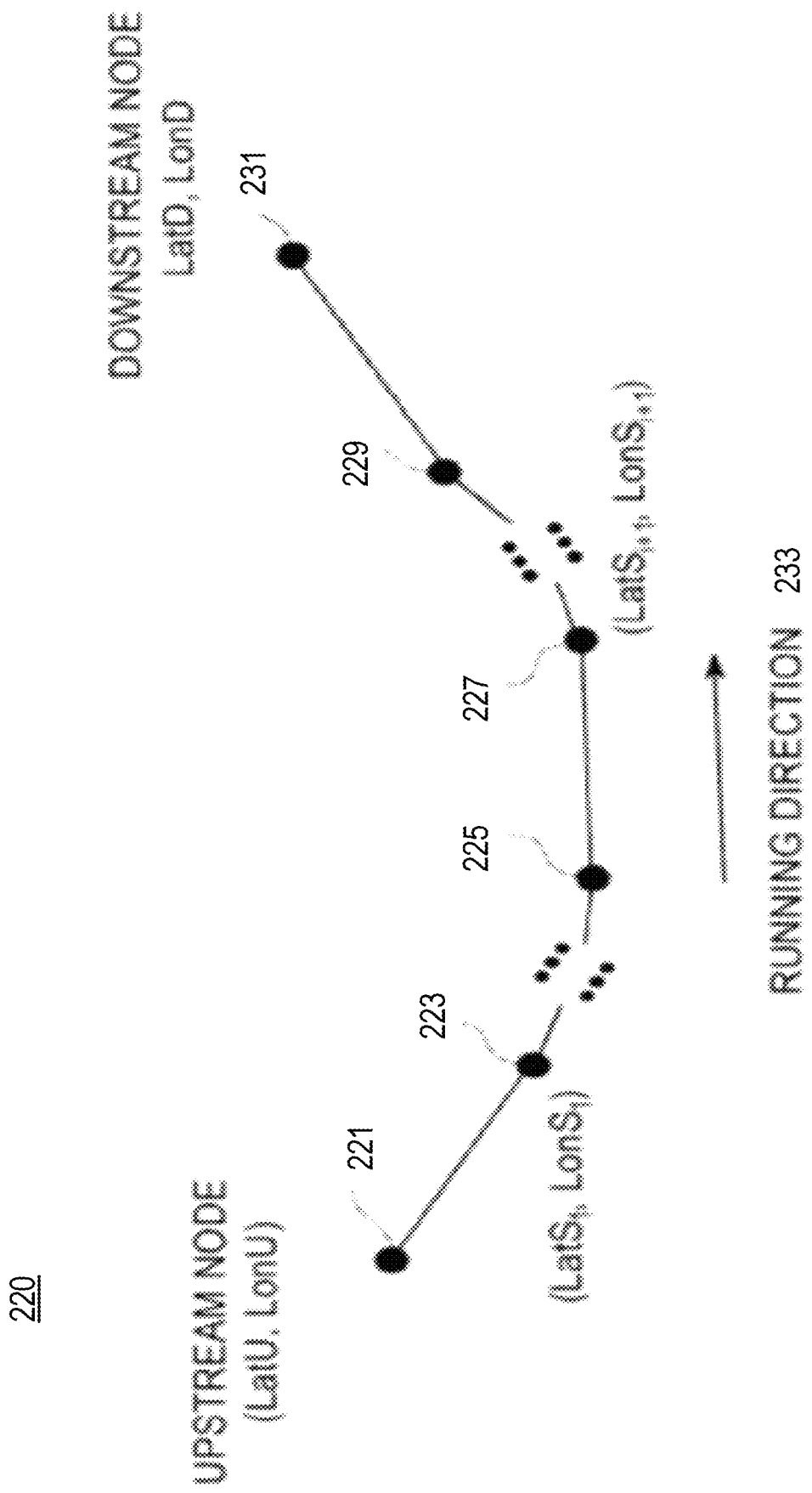
FIG. 2B illustrates a diagram of a geometrical representation of a relational map object base (RMOB) link and associated shape points, according to example embodiment(s)

FIG. 2B illustrates a diagram of a geometrical representation of a RMOB link and associated shape points, according to example embodiment(s). As illustrated in FIG. 2B, a RMOB link 220 can include a plurality of link segments formed between a plurality of nodes 221-231. FIG. 2B alco shows a running direction 233 in which a vehicle 101 can be running when observing the roadwork 102. The first node in the running direction 233 of the RMOB link 220, can be known as the upstream node 221 and the last node in the running direction 233 of the RMOB link 220 can be known as the downstream node 231 for the RMOB link 220. The coordinates of the upstream node 221 can be denoted as (LatU, LonU), while the coordinates of the downstream node 23 can be denoted as (LatD, LonD). The coordinates of the upstream node can be retrieved from a record 240 in FIG. 2C, stored in the map database.

The link segments formed by the intermediate nodes 223-229 each define various shape points, which are modeled according to the geometry of the RMOB link 220. The coordinates of each of the shape points can also be known by defining the coordinates of the intermediate nodes each forming a shape point. For example, the link segment formed between the nodes 221-223 can be denoted as a shape point S1. The coordinates of the nodes 221 and 223 can be used to define the shape point S1. As the coordinates of the node 221, which is the upstream node as discussed, the coordinates of the node 223 can also be retrieved from the map database records, and can be depicted as (LatS1, LonS1). Similarly, the shape points can be numbered along the link segments accordingly. For example, the coordinates of the i+1th node, node 227 for example, can define the shape point $S_{i+1}$, and depicted as: $(LatS_{i+1}, LonS_{i+1})$. The shape points can be numbered starting from 1 and can be referenced with index i for discussion, wherein the smaller is the value of i, the closer the shape point is to the upstream node 221, and the various shape points can be used in performing various calculations for matching a roadwork observation taken on one or the link segments of the RMOB link 220 with correct map location, thereby serving as a translation layer in-between different location referencing schemes.

FIG. 2C illustrates a diagram of a data record 240 of a RMOB link stored in a map database, according to example embodiment(s). The record 240 may include a data component 241 (LatT, LonT), which may be used to store latitude and longitude information respectively for a location for taking traffic incident observation (TIOs). For example, the traffic incident observation may be related to a roadwork observation. The record 240 may further include a data component 243 (HT) which may be used to store a heading information for the location of taking the traffic incident observation, such as the heading of a vehicle 101 at the time of taking the traffic sign observation information.

The record 240 may further include a data component 245 (L) which may be used to store a link ID. For example, an upstream link ID or a downstream link ID which may be used to uniquely identify the link. The record 240 may further include a data component 247 (FC) which may be used to store functional class of the link. The functional class may be anything from 1 to 5, which is generally denoted as FC1, FC2, FC3 and the like. The record 240 may further include a data component 249 (LatU, LonU) which may be used to store geographical co-ordinates, i.e., latitude and longitude information for an upstream node. The record 240 may further include a data component 251 (LatD, LonD) which may be used to store geographical co-ordinates, i.e., latitude and longitude information for a downstream node.

The record 240 may further include a data component 253 $(LatS_i, LonS_i)$ which may be used to store geographical co-ordinates, i.e., latitude and longitude information for a shape point, which are sequenced from i, starting from I. The smaller i is, the closer the shape point is to the upstream node. In some example embodiments, for the latitude and longitude of upstream and downstream node, their Link ID may be annotated on its up right corner. For instance: $LatU^L$ may be the latitude of upstream node in the link L. For latitude and longitude of shape points, annotate its sequence on the down right corner. For instance, $LatS_i^L$ is the latitude of ith shape in Link L. Also, the system 100 can use [ ] to indicate the collections. For instance, [L] indicates all the links in an area. The record 240 may be stored in other suitable data structures in the map database.

Since there is no simple mechanism to match traffic incident extent(s) in TMC message(s) to RMOB links, the system 100 can generate special artifacts to match between TMC links/message(s) and RMOB links (one-to-many), such as matching the traffic incident extent(s) in TMC message(s) to one or more given vertices, geometry of the vertices, lengths of the vertices, etc. of RMOB link(s) as discussed below. In one embodiment, the system 100 can convert TMC location references with an extent of 1 and different location reference types into location library data model specific representations (e.g., OMLL vertices) based on the code snippets in Table 3, and then create location references from OMLL vertices.

TABLE 3

```
import com.here.platform.location.referencing._
import com.here.platform.location.tpeg2.tmc.TMCLocationReference
val tmcReference: TMCLocationReference = getTmcLocationReference
val tmcResolver: LocationReferenceResolver[TMCLocationReference,
BidirectionalLinearLocation] =
   LocationReferenceResolvers.tmc(optimizedMap, cacheManager)
val location: BidirectionalLinearLocation = tmcResolver.resolve(tmcReference)
```

TABLE 3-continued

```
println(s""""Vertices in the:
    | - location: ${location.location.path}
    | - opposite location: ${location.oppositeLocation.map(_.path)}
    |"""".stripMargin)
```

In another embodiment, the system 100 can resolve/create references that have a greater extent with a TMC adjacency provider that can return next and previous locations for a given location with respect to an enclosing linear location.

Referring back to FIG. 2A, the roadwork 102 spreads over RMOB links: Link 3, Link 4, Link 5, Link 6, Link 7. A traffic incident message (e.g., a TMC message) might, but not necessarily, include links that the roadwork 102 spreads over. The optimal scenario is that all the links of the roadwork 102 are included in the same TMC message; however, this is not always the case in realty. Some other scenarios can happen. For instance, none of the links of the roadwork 102 is included in the TMC links (e.g., the links of the roadwork 102 are too new to be included in the TMC tables). If that is the case, the list of TMC links would be empty in the TMC message.

In one embodiment, the system 100 can retrieve one vertex for a give topology segment, i.e., converting a topology segment into a vertex using the mapping layer. For a selected topology segment, the system 100 can expand the start_node_ref object and write down its identifier. To infer the direction of the topology segment, the system 100 can select the nodes at the ends of the topology segment and compare their identifiers with the identifier of the segment start_node_ref. To convert the topology segment, the system 100 can create a Tile Loader for the mapping layer and a tiled reverse map content reference property map. The tiled reverse map content reference property map can consume the partition that the Tile Loader produces for a given tile ID. The code snippet in Table 2 demonstrates how to retrieve the vertex that corresponds to the topology segment (e.g., here: cm:segment:94480838) in partition 23618402:

TABLE 2

```
import com.here.platform.location.integration.heremapcontent.PartitionId
import com.here.platform.location.integration.optimizedmap.OptimizedMapLayers
import com.here.platform.location.integration.optimizedmap.geospatial. {
    HereMapContentReference,
    SegmentId
}
import com.here.platform.location.integration.optimizedmap.graph. {
    MappingTile,
    TiledReverseHereMapContentReferencePropertyMap
val mappingLoader = OptimizedMapLayers.Mapping.tileLoader(optimizedMap,
cacheManager)
val mappingPartitions: Map[TileId, Option[MappingTile]] = mappingLoader
    .getAll(outputTiles)
    .toMap
val optimizedMapMapping = new TiledReverseHereMapContentReferencePropertyMap(
    mappingPartitions,
    mappingLoader.resolver
)
val srcTopologySegment = HereMapContentReference(PartitionId("23618402"),
    SegmentId("here:cm:segment:94480838"),
    Forward)
val vertex = optimizedMapMapping(srcTopologySegment)
println(s"The topology segment $srcTopologySegment corresponds to the vertex $vertex")
```

As another instance, some of the links of the roadwork 102 are included in the TMC links, while others are not. In this case, the list of TMC links would not be empty in the TMC message but would not cover all the links of the roadwork 102. As another instance, a TMC message can include some link(s) that the roadwork 102 does not spread over. As another instance, a TMC message can include some link(s) of the roadwork 102 yet missing some other some link(s) of the roadwork 102 for some reason(s). As such, the system 100 use TS segments or section to verify the traffic incident extent in a traffic incident message.

Since there is no simple mechanism to match traffic incident extent(s) in topology segments (TSs) or a TS section to RMOB links, the system 100 can also generate special artifact to match between TSs and RMOB links (one-to-many), such as matching the traffic incident extent(s) in the topology segments (TSs) or the TS section to one or more given vertices, geometry of the vertices, lengths of the vertices, etc. of RMOB link(s) as discussed below.

In one embodiment, the system 100 can retrieve the geometry of a given vertex from a geometry layer in the OMLL that stores the shapes of the road segments. For instance, a tile of the geometry layer contains (1) the road shape of each segment that crosses the tile, and (2) a spatial index for efficient searches within a given area. The system 100 can then create a property map from geometry layer partitions that is enabled by a tiled geometry property map. The tiled geometry property map can return a directed geometry for each vertex: the points of the geometry occur in the travel direction of this vertex.

In one embodiment, the system 100 can retrieve the length of a given vertex from a length layer in meters.

After converting the TMC message(s) and the TS or TS section into RMOB links, the system 100 can verify the TMC message(s) based on a Naïve solution at a link level and/or an Enhanced solution at a section level.

Based on the Naïve solution at a link level, the system 100 can collect all RMOB links converted from the TMC message(s) corresponding to a traffic incident extent into a first set, and all RMOB links converted from topology segment(s) corresponding to the traffic incident extent as a second set. The intersection of two sets is determined. The system 100 can determine an intersection set between the first and second sets of the RMOB links. For each RMOB links in the intersection set, the system 100 can confirm the RMOB link is part of the traffic incident extent, when the corresponding sensor data has, for example, a probability of 0.7 or more and a confidence level of 33.33 (single vehicle) or more. Otherwise, the RMOB link is not part of the traffic incident extent and thus is cancelled from the map database. When there is no corresponding sensor data for the RMOB link, the system 100 makes no decision with respect to the traffic incident extent. Referring back to FIG. 2A, the Naïve solution does not support calculation of RMOB link level offsets, such as an RMOB start offset 209 from the start point of the RMOB Link 3, an RMOB end offset 211 from the end point of the RMOB Link 7, etc. marked with "?".

Based on the Enhanced solution at a section level, the system 100 can collect all RMOB links converted from the TMC message(s) corresponding to a traffic incident extent into a first set, and all RMOB links converted from TSs corresponding to the traffic incident extent as a second set. The system 100 can determine an intersection set between the first and second sets of the RMOB links, connect RMOB links in the intersection set into one or more chains of RMOB links comprising the TMC location codes/offsets in the TMC message, and extract geometry of each of the chains.

For each RMOB link in the intersection set, the system 100 can calculate start and end offsets within each corresponding link with respect to the traffic incident extent. In one embodiment, the offset from the start and end points can be calculated from the difference in length of the position of the start or end in the particular link. For example, the offset of the start of the traffic incident 102 is depicted as 209 and referenced from the start of Link3 in FIG. 2A, while the offset of the end of the traffic incident 102 is depicted as 203 and referenced from the end of Link 8 in FIG. 2A.

In one embodiment, for each RMOB section including at least one of the RMOB link in the intersection set, the system 100 can confirm the RMOB section is part of the traffic incident extent, when the corresponding sensor data has probability of, for example, 0.7 or more and a confidence level of 33.33 (single vehicle) or more. The system 100 can also send an update for increased confidence to the map database for the traffic incident. Otherwise, the RMOB section of several TSs meeting a total threshold length is not part of the traffic incident extent thus it is cancelled from the map database. For instance, the total threshold length is configurable, such as 0.75 of the original TS section length in FIG. 2A. The verification results do not change by much as the system 100 moves the threshold length from 0.75 towards 1.

In another embodiment, for each RMOB chain in the intersection set, the system 100 can confirm the RMOB chain is part of the traffic incident extent, when the corresponding sensor data has probability, for example, of 0.7 or more and a confidence level of 33.33 (single vehicle) or more. Otherwise, the RMOB chain is not part of the traffic incident extent thus is cancelled from the map database. When there is no corresponding sensor data for the RMOB chain, the system 100 makes no decision with respect to the traffic incident extent.

The sensor data can include probe data that may be recent or real-time depending on the data availability. For busy roads, there are sufficient real-time data points. On the other hand, for less used roads, the sensor data can be collected recently (e.g., for a period of time). The system 100 can extract real-time lane traffic flow and/or incident data from the probe/sensor data. In one instance, the probe data may be reported as real-time probe points, which are individual data records collected at a point in time that records telemetry data for that point in time. A probe point can include attributes such as: (1) probe ID, (2) longitude, (3) latitude, (4) altitude, (5) heading, (6) speed, and (7) time.

By way of example, the system 100 can extract location and speed data of probe points heading toward the same direction on a roadway at a current time point, and aggregate some of the probe points of the same speed range (e.g., a heavy congestion speed range of 0-1 mph) into a roadwork section on the roadway, to generate a traffic incident message (e.g., a TMC message), then verify the traffic incident reporting messages thus improving navigation, estimated times of arrival, supporting advanced driver-assistance systems (ADAS), etc. based on the above-discussed embodiments.

In one embodiment, the system 100 collects a plurality of instances of probe data, vehicle sensor data, and/or traffic incident information from vehicles 101 having one or more vehicle sensors 103a-103n (collectively referred to as vehicle sensors 103) (e.g., global positioning system (GPS), LiDAR, camera sensor, etc.) and having connectivity to a traffic platform 105 via a communication network 107.

In one instance, the system 100 can also collect the real-time probe data, sensor data, and/or traffic incident information from one or more user equipment (UE) 109a-109n (also collectively referenced to herein as UEs 109) associated with the a vehicle 101 (e.g., an embedded navigation system), a user or a passenger of a vehicle 101 (e.g., a mobile device, a smartphone, etc.), or a combination thereof. In one embodiment, the system 100 can collect crowdsourced traffic incident data that can include user-reported accidents, traffic jams, speed, and police traps, etc., via navigation and/or map applications such as Waze®, etc. In one instance, the UEs 109 may include one or more applications 111a-111n (also collectively referred to herein as applications 111) (e.g., a navigation or mapping application). In one embodiment, the probe data and/or sensor data collected may be stored in a probe database 113, a geographic database 115, or a combination thereof.

In one instance, the system 100 may also collect real-time probe data, sensor data, and/or traffic incident information from one or more other sources such as government/municipality agencies, local or community agencies (e.g., a police department), and/or third-party official/semi-official sources (e.g., a services platform 117, one or more services 119a-119n, one or more content providers 121a-121m (also collectively referred to herein as content providers 121), etc.). In one embodiment, the system 100 may collect the authority incident data that can include traffic incident feeds, traffic crash reports, police reports, etc. published by public authorities. In another embodiment, the system 100 can collect video monitoring incident data that can include traffic monitoring camera data, etc.

Figure 3:
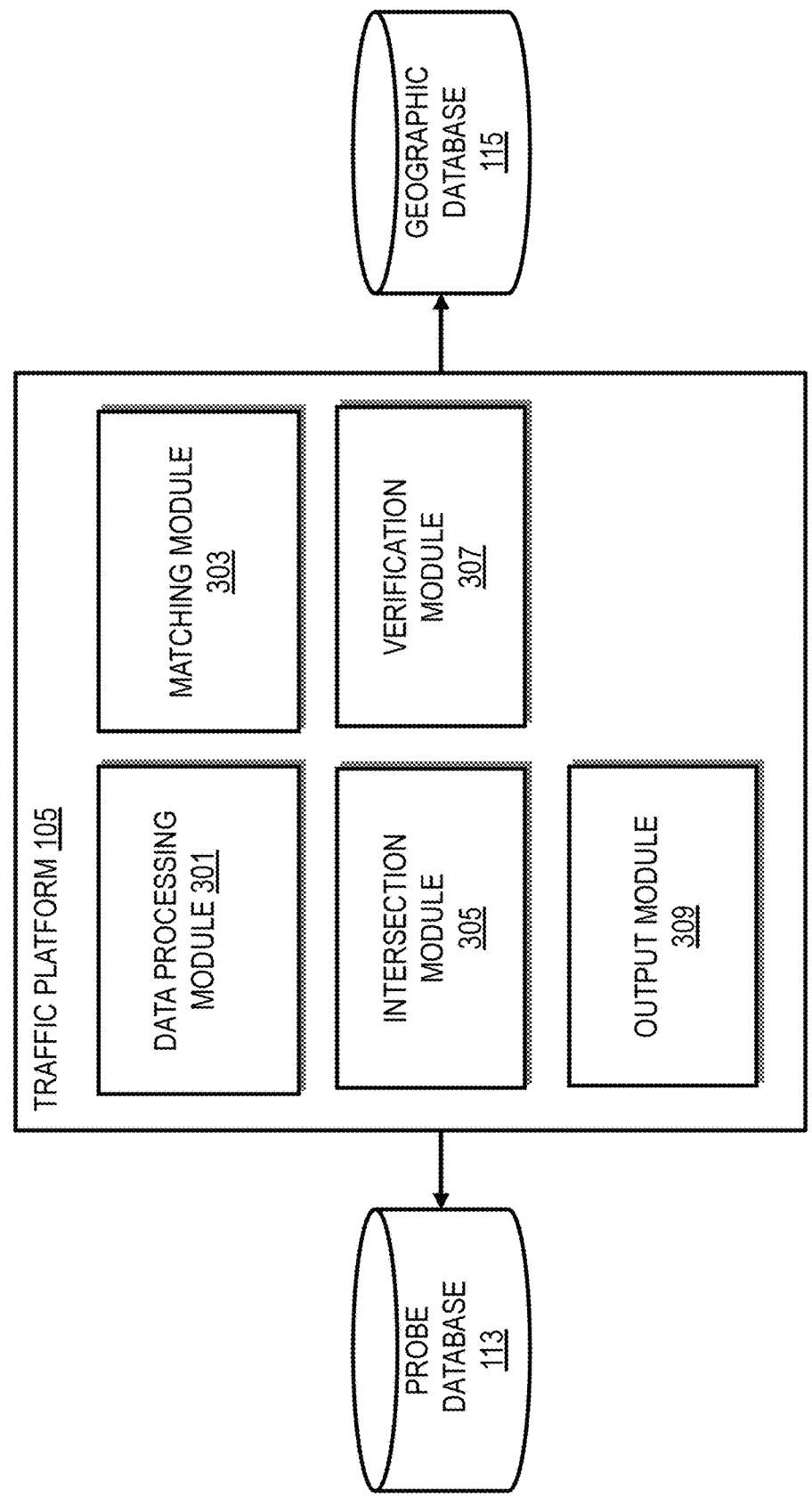
FIG. 3 is a diagram of components of a traffic platform capable of traffic incident verification via fusion of a location referencing scheme (e.g., TMC specification) and vehicle sensor data, according to example embodiment(s)

FIG. 3 is a diagram of the components of the traffic platform 105, according to example embodiment(s). By way of example, the traffic platform 105 includes one or more components for traffic incident verification via fusion of a location referencing scheme (e.g., TMC specification) and vehicle sensor data, according to the various embodiments described herein. It is contemplated that the functions of these components may be combined or performed by other components of equivalent functionality. In one embodiment, the traffic platform 105 includes a data processing module 301, a matching module 303, an intersection module 305, a verification module 307, and an output module 309, with connectivity to the probe database 113 and the geographic database 115. The above presented modules and components of the traffic platform 105 can be implemented in hardware, firmware, software, or a combination thereof. Though depicted as a separate entity in FIG. 1, it is contemplated that the traffic platform 105 may be implemented as a module of any other component of the system 100. In another embodiment, the traffic platform 105, and/or the modules 301-309 may be implemented as a cloud-based service, local service, native application, or combination thereof. The functions of the traffic platform 105, and/or the modules 301-309 are discussed with respect to FIGS. 4-6.

Figure 9:
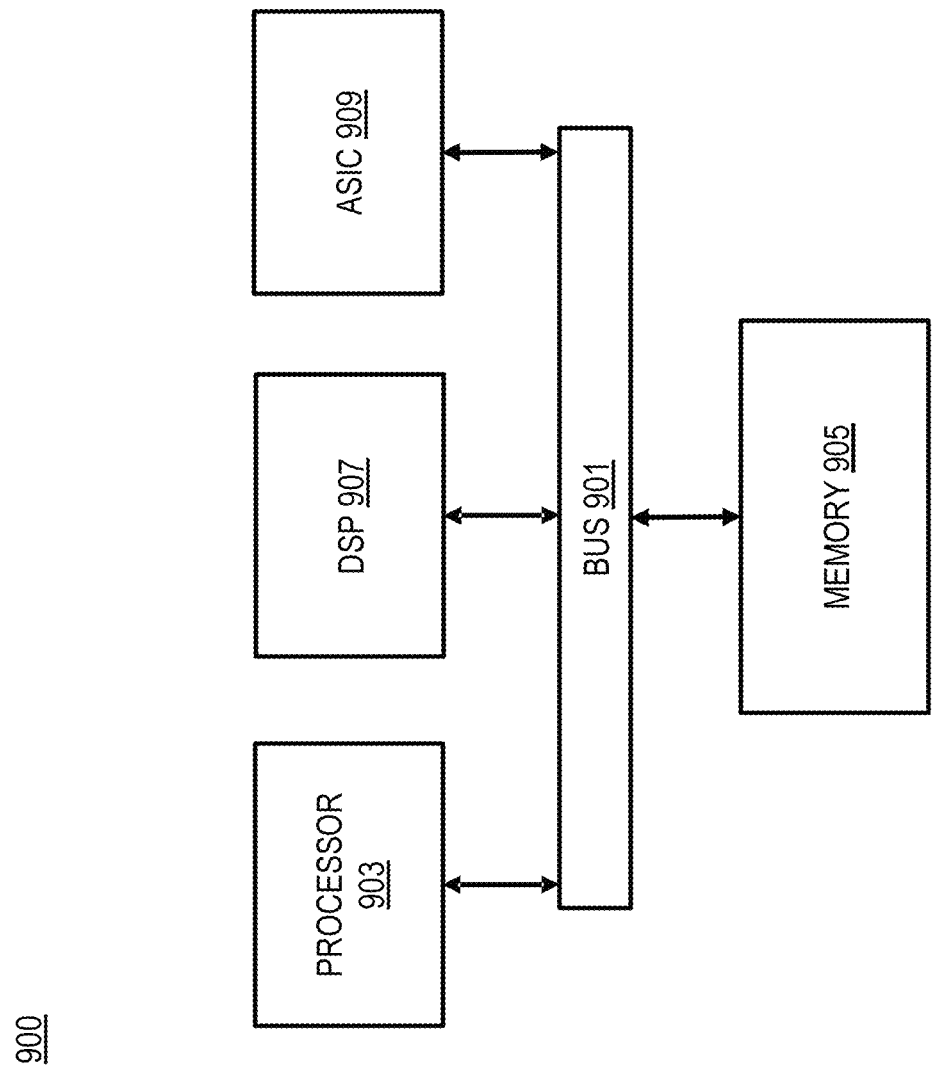
FIG. 9 is a diagram of a chip set that can be used to implement an embodiment.

FIG. 4 is a flowchart of a process 400 for providing traffic incident verification via fusion of a location referencing scheme (e.g., TMC specification) and vehicle sensor data, according to example embodiment(s). In various embodiments, the traffic platform 105, and/or any of the modules 301-309 may perform one or more portions of the process 400 and may be implemented in, for instance, a chip set including a processor and a memory as shown in FIG. 9. As such, the traffic platform 105 and/or the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In one embodiment, for example, in step 401, the data processing module 301 can receive at least one traffic message channel (TMC) message indicating a traffic incident (e.g., a road construction event like the roadwork 102). For instance, the at least one TMC message indicates an extent of the traffic incident in a road graph using one or more TMC location codes (e.g., TMC code 1, TMC code 2 in FIG. 2A) and one or more TMC location offsets (e.g., TMC start offset 201, TMC end offset 203 in FIG. 2A).

In one embodiment, in step 403, the matching module 303 can match the one or more TMC locations codes (e.g., TMC code 1, TMC code 2 in FIG. 2A) and the one or more TMC location offsets (e.g., TMC start offset 201, TMC end offset 203 in FIG. 2A) to a first set of one or more map road links (e.g., RMOB links: Link 3, Link 4, Link 5, Link 6, Link 7 in FIG. 2A) and one or more link offsets (e.g., RMOB start offset 209, RMOB end offset 211 in FIG. 2A) of a geographic database (e.g., the geographic database 115).

In one embodiment, in step 405, the data processing module 301 can determine sensor data collected from one or more sensors (e.g., of the sensors 103) of one or more vehicles (e.g., vehicles 101) travelling within the road graph. For instance, the sensor data indicates the extent as one or more location points (e.g., TS location points 213a, 213b, 213c, 213d, 213e in FIG. 2A) of one or more topology segments (TSs) (e.g., TS1, TS2, TS3, TS4 in FIG. 2A) and one or more TS offsets (e.g., TS start offset 205, TS end offset 207 in FIG. 2A).

In one embodiment, in step 407, the matching module 303 can match the one or more location points (e.g., TS location points 213a, 213b, 213c, 213d, 213e in FIG. 2A) of the one or more TSs (e.g., TS1, TS2, TS3, TS4 in FIG. 2A) and TS offsets (e.g., TS start offset 205, TS end offset 207 in FIG. 2A) to a second set of one or more map road links (e.g., RMOB links: Link 3, Link 4, Link 5, Link 6, Link 7 in FIG. 2A) and one or more link offsets (e.g., RMOB start offset 209, RMOB end offset 211 in FIG. 2A) of the geographic database (e.g., the geographic database 115).

In one embodiment, in step 409, the intersection module 305 can determine an intersection set (e.g., RMOB links: Link 3, Link 4, Link 5, Link 6, Link 7 in FIG. 2A) between the first and second sets of the one or more map road links.

In one embodiment, in step 411, the verification module 307 can initiate a confirmation of the traffic incident reported in the at least one TMC message based on the sensor data of the one or more location points of the one or more TSs in the intersection set (e.g., the Naïve solution).

In one embodiment, the data processing module 301 can process the one or more location points (e.g., TS location points 213a, 213b, 213c, 213d, 213e in FIG. 2A) of the sensor data to build a route corresponding to the extent, and split the route into the one or more TSs (e.g., TS1, TS2, TS3, TS4 in FIG. 2A) and one or more TS offsets (e.g., TS start offset 205, TS end offset 207 in FIG. 2A). For each TS of the one or more TSs, the data processing module 301 can compute a probability, a confidence, or a combination thereof of the traffic incident, and the confirmation of the traffic incident is based on the probability, the confidence, or the combination thereof. For example, a RMOB link is confirmed as a part of the traffic incident extent, when the corresponding sensor data has probability of 0.7 or more and a confidence level of 33.33 (single vehicle) or more. Otherwise, the RMOB link is not part of the traffic incident extent thus is cancelled from the geographic database.

In one embodiment, the probability can be calculated by dividing the number of traffic incident observations by a total number of vehicle trips on the road link during the same time period.

In one embodiment, the confidence can be affected by the number of vehicle observations of a traffic incident (e.g., a roadwork zone), faulty or functional vehicle sensors, weather, speed limits, etc. As more vehicles observe the same traffic incident, the higher the confidence level becomes. As fewer vehicles observe the same traffic incident, the lower the confidence level becomes. The confidence level may also be dependent on the vehicle or vehicle sensor confidence level. Therefore, data sets with a higher vehicle or vehicle sensor confidence levels may have a higher confidence level. For instance, a better equipped vehicle may have a higher confidence level than a lower equipped vehicle. Three different confidence level values like a high level (e.g., 99.9), a middle level (e.g., 66.6), and a low level (e.g., 33.3) may be sufficient. It may be desirable to have a higher number of confidence levels like nine levels which allow more detailed distinguishing.

In another embodiment, the confidence level may be low when a significant new information has been reported the first time by a vehicle. In another embodiment, the confidence level may be high for important or urgent information. For example, a dynamically changed speed limit on a highway can be an urgent information. As another example, a road marking change is important yet less urgent, as it takes hours or days to determine.

In another embodiment, the confidence can be calculated as a percentage of false positive traffic incident signals/reports statistically. For instance, the system 100 can assume that both faulty and functional vehicles generate traffic incident signals/reports on real traffic incidents, while only faulty vehicles generate false positive traffic incident signals/reports on non-traffic incidents. In other words, the system 100 can take data at time periods when the condition is definitely true or almost definitely true, and at time periods when the condition is definitely false or almost definitely false, to calculate from both numbers an approximate percentage of the vehicles reporting erroneously.

In another embodiment (e.g., the Enhanced solution), the at least one TMC message specifies a starting point of the extent based on a first TMC location code (e.g., TMC code 1) and a first offset (e.g., TMC start offset 201), and specifies an ending point of the extent based on a second TMC location code (e.g., TMC code 2) and a second offset (e.g., TMC end offset 203). The intersection module 305 can determine a chain of TMC location codes (e.g., TMC code 1, TMC code 2, etc.) spanning from the starting point to the ending point, and the first set can include one or more additional map road links (e.g., RMOB links: Link 3, Link 4, Link 5, Link 6, Link 7 in FIG. 2A) of the geographic database corresponding to the chain of TMC location codes. The intersection module 305 can extract a road geometry of the chain, and calculate a starting offset and an ending offset of the first set based on the road geometry.

In another embodiment, the verification module 307 can initiate a cancellation of the at least one TMC message based on the confirmation indicating that the traffic incident is not confirmed by the sensor data.

Figure 5A:
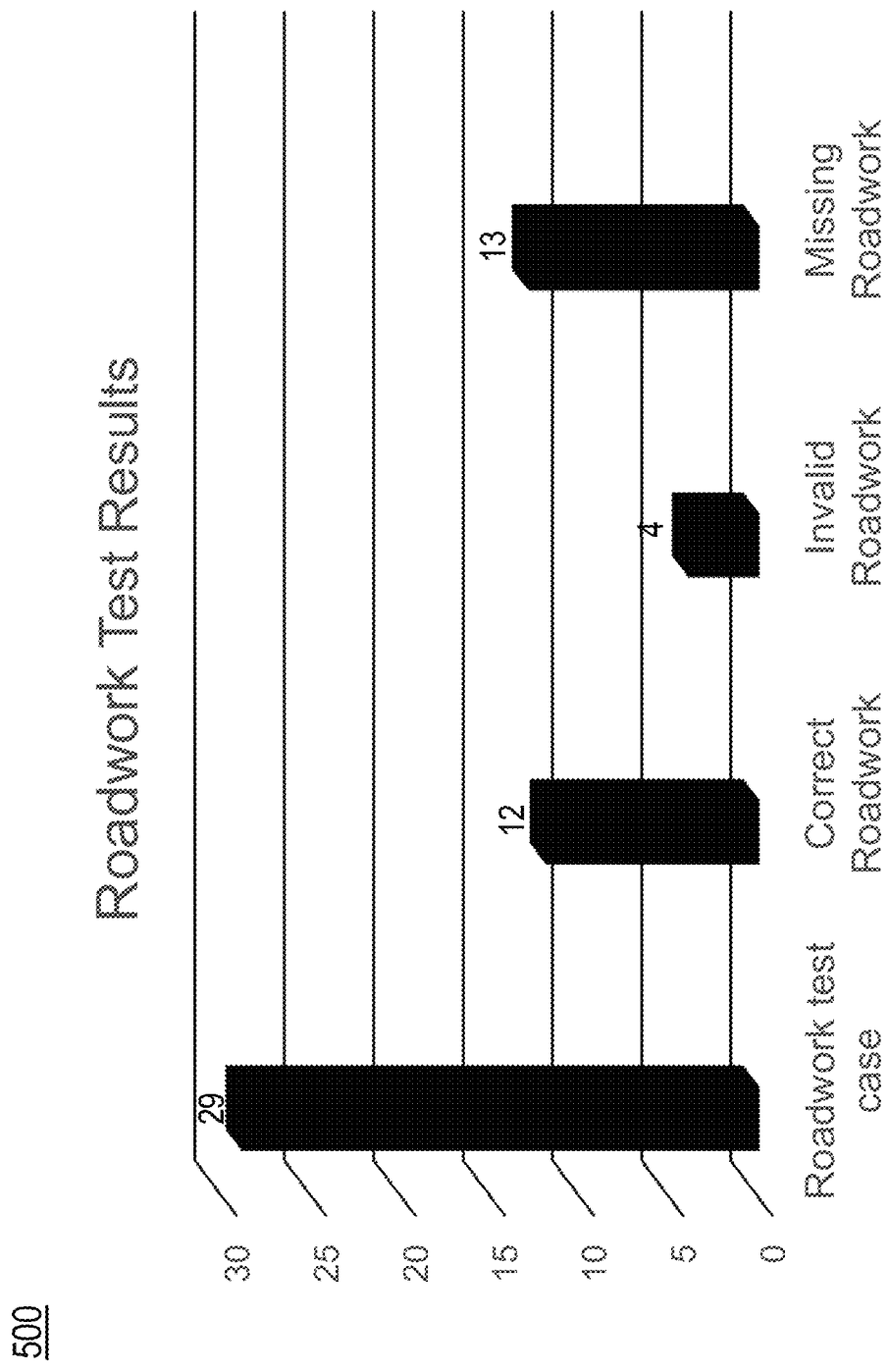
FIGS. 5A-5B are diagrams of drive test results based on the enhanced solution taken in Italy and Chicago, according to example embodiment(s)
Figure 5B:
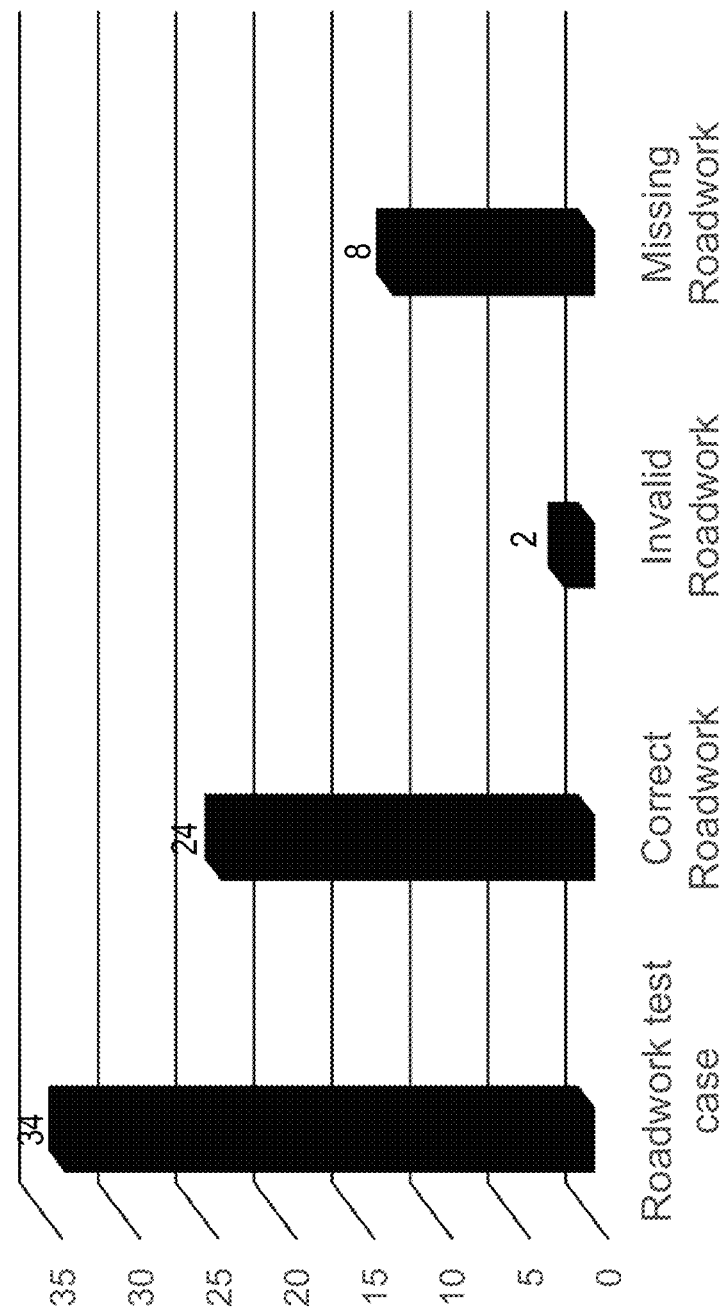

In one embodiment, in step 413, the output module 309 providing the confirmation as an output. FIGS. 5A-5B are diagrams 500, 520 of drive test results based on the enhanced solution taken in Italy and Chicago, according to example embodiment(s). For instance, in the diagram 500, among the 34 TMC reported roadwork test cases in Italy, the system 100 applied the enhanced solution and verified 12 of the roadwork test cases were correct, 4 cases were invalid, and 13 cases were missing. In Chicago as shown in the diagram 520, among the 34 TMC reported roadwork test cases, the system 100 applied the enhanced solution and verified 24 of the roadwork test cases were correct, 2 cases were invalid, and 8 cases were missing.

Figure 6A:
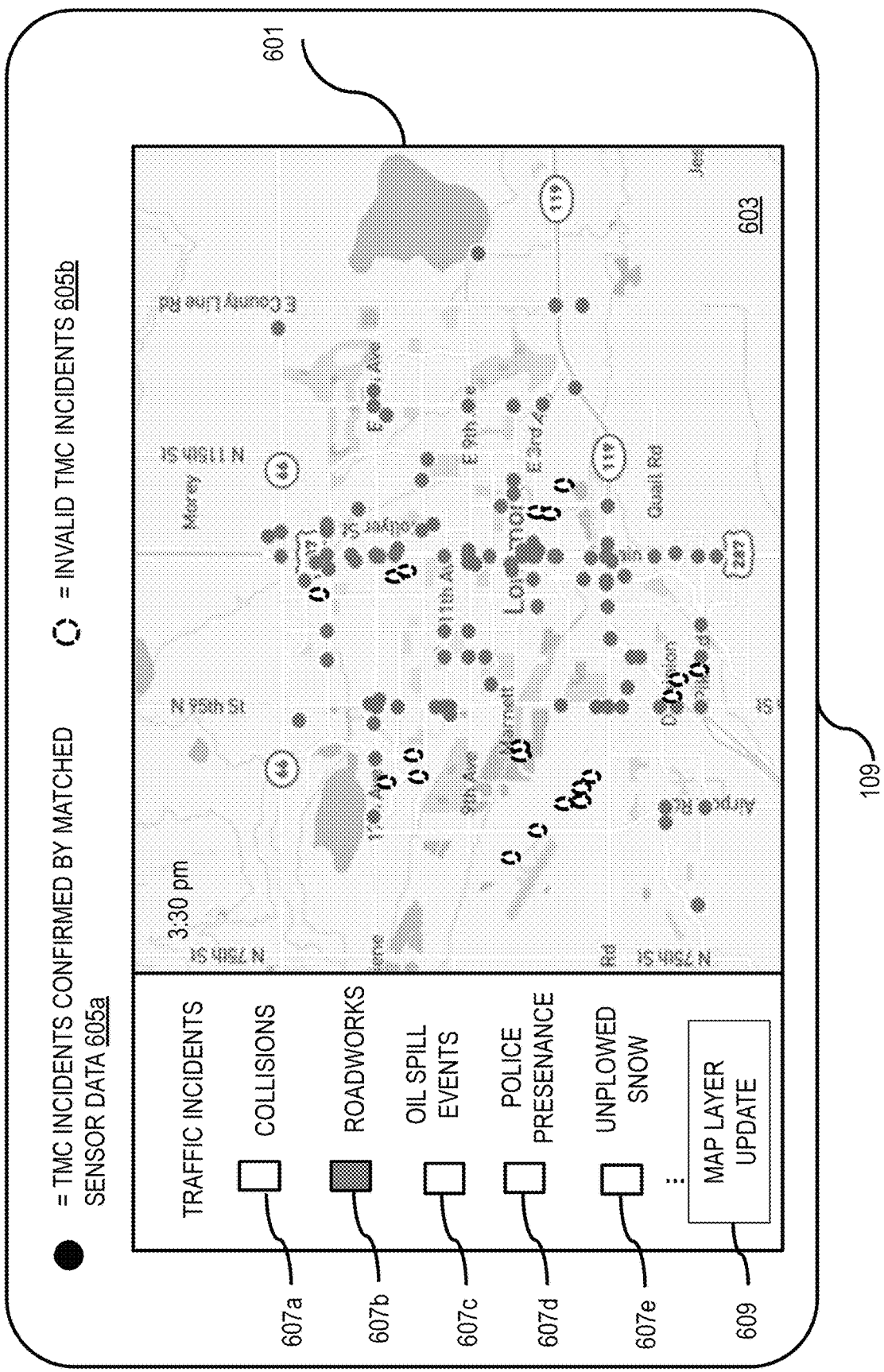
FIG. 6A is a diagram of an example user interface verifying real-time traffic incident reports, according to example embodiment(s)

FIG. 6A is a diagram of an example user interface verifying real-time traffic incident reports, according to example embodiment(s). In FIG. 6A, in one embodiment, the system 100 can generate a user interface (UI) 601 (e.g., via the mapping platform 105, the application 111, etc.) for a UE 109 (e.g., a mobile device, a smartphone, a client terminal, etc.) that can allow a user (e.g., a mapping service provider staff, an OEM staff, etc.) to see traffic incident data currently and/or over time (e.g., an hour, a day, a week, a month, a year, etc.) in an area presented over a map 603, upon selection of one type of road incidents (e.g., roadwork zones). The user can access the data based on a respective data security access level. In addition, the user can select to view one or more types of data objects of a selected road incident type (e.g., roadwork zones) verified as the above-discussed embodiments, such as TMC incidents confirmed by matched sensor data 605a and invalid TMC incidents 605b in FIG. 6A. For instance, TMC incidents are confirmed by map-matching the TMC to links of the geographic database, and then matching to intersecting topology segments of the sensor data that are matched to links of the geographic database.

Moreover, the user can select one or more traffic incident types by checking boxes 607a-607e for the selected traffic incident types (e.g., collisions, roadworks, oil spill events, police presence, unplowed snow, etc.). For instance, roadworks are selected, such that FIG. 6A shows the TMC incidents confirmed by matched sensor data 605a (e.g., in block dots) and the invalid TMC incidents 605b (e.g., in white dots). Subsequently, the user can select a button 609 to proceed with updating a map layer with only TMC incidents confirmed by matched sensor data as shown in FIG. 6B.

Figure 6B:
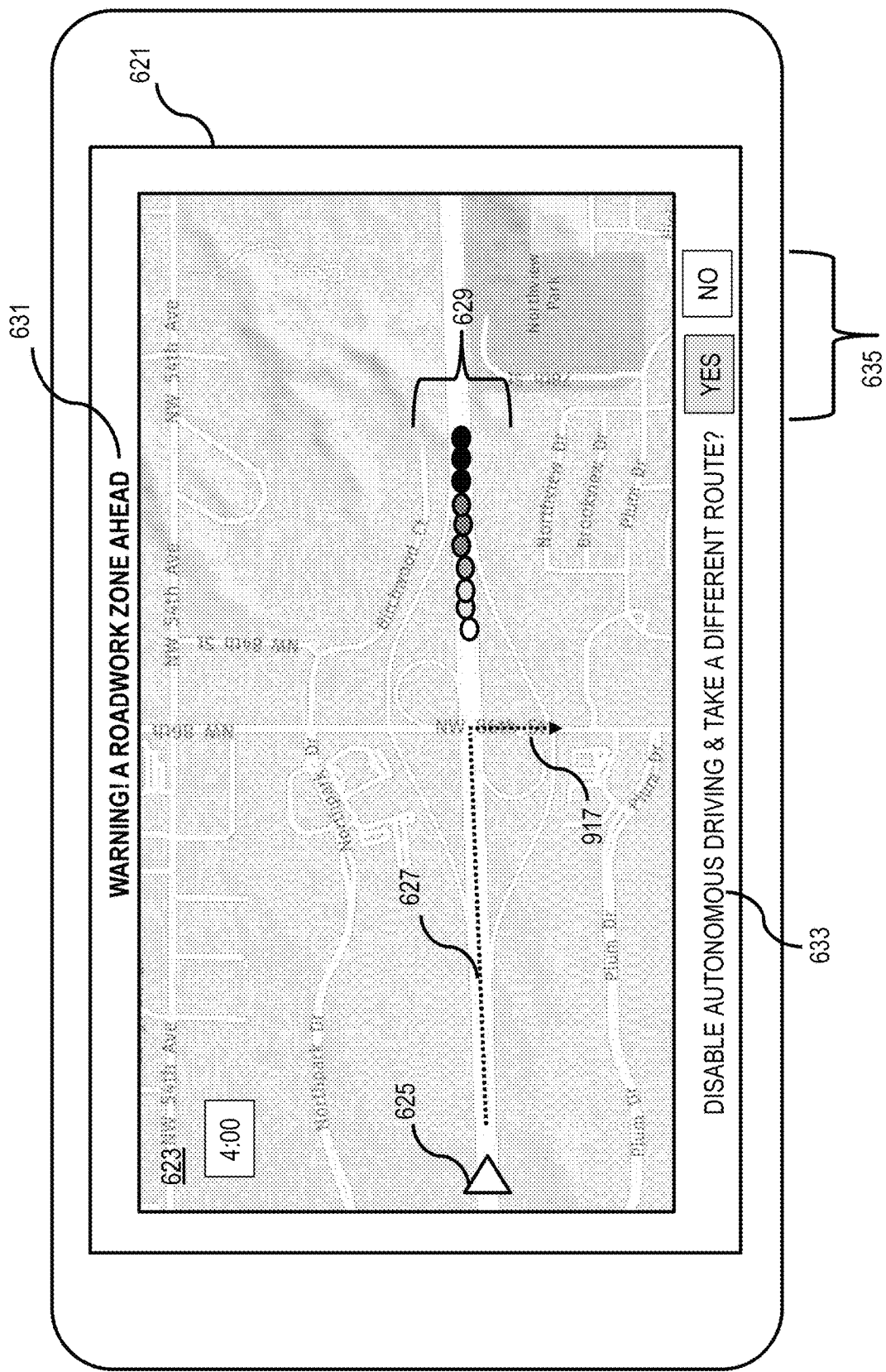
FIG. 6B is a diagram of an example user interface verifying real-time traffic incident reports, according to example embodiment(s)

FIG. 6B is a diagram of an example user interface verifying real-time traffic incident reports, according to example embodiment(s). In FIG. 6B, in one embodiment, the system 100 can generate a user interface (UI) 621 for a vehicle 101 and/or a UE 109 (e.g., a mobile device with applications 111 that can enable navigation, etc.). In one instance, the system 100 can generate the UI 621 such that it includes a map 623. For instance, the map 623 can depict a vehicle 625 (e.g., the vehicle 101) carrying a user along a path 627 taken by the vehicle 625. Upon receiving a report of a road incident 626 (e.g., a traffic accident) occurring on the path 627 as verified based on the above-discussed embodiments, the system 100 can generate the UI 621 such that it includes an alert 631 for a roadwork zone 629: "Warning! A roadwork zone ahead", and a query 633: "Disable automatous driving and take a different route?" The system 100 can receive a user selection of an input 635 with two buttons (e.g., "Yes" and "No") to determine whether to switch out of autonomous driving and detour from the roadwork zone. In addition, the system 100 can further generate the UI 621 such that it includes an alternative route 637.

Returning to FIG. 1, in one embodiment, the traffic platform 105 has connectivity over the communication network 107 to the services platform 117 (e.g., an OEM platform) that provides one or more services 119 (e.g., probe and/or sensor data collection services). By way of example, the services 119 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g. lane-level dangerous slowdown event detection and messages) of the traffic platform 105 to provide services such as navigation, mapping, other location-based services, etc.

In one embodiment, the traffic platform 105 may be a platform with multiple interconnected components. The traffic platform 105 may include multiple servers, intelligent networking devices, computing devices, components, and corresponding software for providing parametric representations of lane lines. In addition, it is noted that the traffic platform 105 may be a separate entity of the system 100, a part of the services platform 117, a part of the one or more services 119, or included within the vehicles 101 (e.g., an embedded navigation system).

In one embodiment, content providers 121 may provide content or data (e.g., including probe data, sensor data, etc.) to the traffic platform 105, the UEs 109, the applications 111, the probe database 113, the geographic database 115, the services platform 117, the services 119, and the vehicles 101. The content provided may be any type of content, such as map content, textual content, audio content, video content, image content, etc. In one embodiment, the content providers 121 may provide content that may aid in localizing a vehicle path or trajectory on a lane of a digital map or link. In one embodiment, the content providers 121 may also store content associated with the traffic platform 105, the probe database 113, the geographic database 115, the services platform 117, the services 119, and/or the vehicles 101. In another embodiment, the content providers 121 may manage access to a central repository of data, and offer a consistent, standard interface to data, such as a repository of the geographic database 115.

By way of example, the UEs 109 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.). In one embodiment, a UE 109 may be associated with a vehicle 101 (e.g., a mobile device) or be a component part of the vehicle 101 (e.g., an embedded navigation system). In one embodiment, the UEs 109 may include the traffic platform 105 to provide traffic incident verification via fusion of a location referencing scheme (e.g., TMC specification) and vehicle sensor data.

In one embodiment, as mentioned above, the vehicles 101, for instance, are part of a probe-based system for collecting probe data and/or sensor data for detecting traffic incidents (e.g., dangerous slowdown events) and/or measuring traffic conditions in a road network. In one embodiment, each vehicle 101 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) altitude, (5) heading, (6) speed, and (7) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include sensors 103 for reporting measuring and/or reporting attributes. The attributes can also be any attribute normally collected by an on-board diagnostic (OBD) system of the vehicle 101, and available through an interface to the OBD system (e.g., OBD II interface or other similar interface).

The probe points can be reported from the vehicles 101 in real-time, in batches, continuously, or at any other frequency requested by the system 100 over, for instance, the communication network 107 for processing by the traffic platform 105. The probe points also can be map matched to specific road links stored in the geographic database 115. In one embodiment, the system 100 (e.g., via the traffic platform 105) can generate probe traces (e.g., vehicle paths or trajectories) from the probe points for an individual probe so that the probe traces represent a travel trajectory or vehicle path of the probe through the road network.

In one embodiment, as previously stated, the vehicles 101 are configured with various sensors (e.g., vehicle sensors 103) for generating or collecting probe data, sensor data, related geographic/map data, etc. In one embodiment, the sensed data represents sensor data associated with a geographic location or coordinates at which the sensor data was collected. In one embodiment, the probe data (e.g., stored in the probe database 113) includes location probes collected by one or more vehicle sensors 103. By way of example, the vehicle sensors 103 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged, and the like. Though depicted as automobiles, it is contemplated the vehicles 101 can be any type of vehicle manned or unmanned (e.g., cars, trucks, buses, vans, motorcycles, scooters, drones, etc.) that travel through road segments of a road network.

Other examples of sensors 103 of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 101 along a path of travel (e.g., while on a hill or a cliff), moisture sensors, pressure sensors, etc. In a further example embodiment, sensors 103 about the perimeter of the vehicle 101 may detect the relative distance of the vehicle 101 from a physical divider, a lane line of a link or roadway, the presence of other vehicles, pedestrians, traffic lights, potholes and any other objects, or a combination thereof. In one scenario, the vehicle sensors 103 may detect weather data, traffic information, or a combination thereof. In one embodiment, the vehicles 101 may include GPS or other satellite-based receivers 103 to obtain geographic coordinates from satellites 123 for determining current location and time. Further, the location can be determined by visual odometry, triangulation systems such as A-GPS, Cell of Origin, or other location extrapolation technologies.

In one embodiment, the UEs 109 may also be configured with various sensors (not shown for illustrative convenience) for acquiring and/or generating probe data and/or sensor data associated with a vehicle 101, a driver, other vehicles, conditions regarding the driving environment or roadway, etc. For example, such sensors may be used as GPS receivers for interacting with the one or more satellites 123 to determine and track the current speed, position, and location of a vehicle 101 travelling along a link or roadway. In addition, the sensors may gather tilt data (e.g., a degree of incline or decline of the vehicle during travel), motion data, light data, sound data, image data, weather data, temporal data and other data associated with the vehicles 101 and/or UEs 109. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via communication network 107 as probe data (e.g., GPS probe data) according to any known wireless communication protocols. For example, each UE 109, application 111, user, and/or vehicle 101 may be assigned a unique probe identifier (probe ID) for use in reporting or transmitting said probe data collected by the vehicles 101 and/or UEs 109. In one embodiment, each vehicle 101 and/or UE 109 is configured to report probe data as probe points, which are individual data records collected at a point in time that records telemetry data.

In one embodiment, the traffic platform 105 retrieves aggregated probe points gathered and/or generated by the vehicle sensors 103 and/or the UE 109 resulting from the travel of the UEs 109 and/or vehicles 101 on a road segment of a road network. In one instance, the probe database 113 stores a plurality of probe points and/or trajectories generated by different vehicle sensors 103, UEs 109, applications 111, vehicles 101, etc. over a period while traveling in a monitored area. A time sequence of probe points specifies a trajectory—i.e., a path traversed by a UE 109, application 111, vehicle 101, etc. over the period.

In one embodiment, the communication network 107 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, vehicle sensors 103, traffic platform 105, UEs 109, applications 111, services platform 117, services 119, content providers 121, and/or satellites 123 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI reference model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 7:
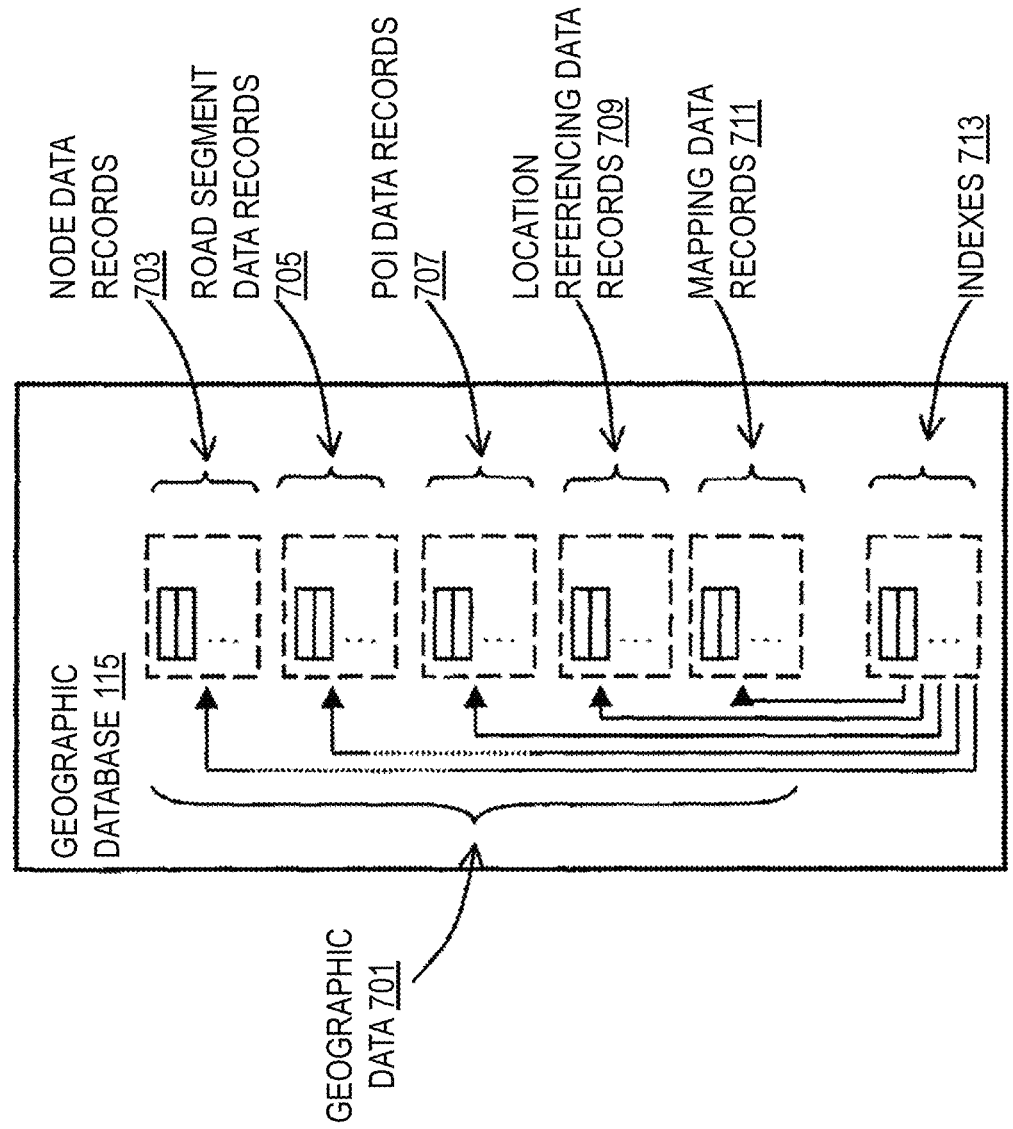
FIG. 7 is a diagram of a geographic database, according to example embodiment(s)

FIG. 7 is a diagram of a geographic database (such as the database 115), according to example embodiment(s). In one embodiment, the geographic database 115 includes geographic data 701 used for (or configured to be compiled to be used for) mapping and/or navigation-related services, such as for video odometry based on the parametric representation of lanes include, e.g., encoding and/or decoding parametric representations into lane lines. In one embodiment, the geographic database 115 include high resolution or high definition (HD) mapping data that provide centimeter-level or better accuracy of map features. For example, the geographic database 115 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 711) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 703, road segment or link data records 705, POI data records 707, location referencing data records 709, mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 115. In one embodiment, the indexes 713 may be used to quickly locate data without having to search every row in the geographic database 115 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points (such as intersections) corresponding to the respective links or segments of the road segment data records 705. The road link data records 705 and the node data records 703 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 707. The geographic database 115 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city). In one embodiment, certain attributes, such as lane marking data records, mapping data records and/or other attributes can be features or layers associated with the link-node structure of the database.

In one embodiment, the geographic database 115 can also include location referencing data records 709 for storing sensor data, TMC location codes and TMC location offsets, a first set of map road links and link offsets of a geographic database, location points of topology segments (TSs) and TS offsets, a second set of map road links and one or more link offsets of the geographic database, an intersection set of the first and second sets, confirmation/cancellation of the traffic incident reported in the at least one TMC message, training data, prediction models, annotated observations, computed featured distributions, sampling probabilities, and/or any other data generated or used by the system 100 according to the various embodiments described herein. By way of example, the location referencing data records 709 can be associated with one or more of the node records 703, road segment records 705, and/or POI data records 707 to support localization or visual odometry based on the features stored therein and the corresponding estimated quality of the features. In this way, the records 709 can also be associated with or used to classify the characteristics or metadata of the corresponding records 703, 705, and/or 707.

In one embodiment, as discussed above, the mapping data records 711 model road surfaces and other map features to centimeter-level or better accuracy. The mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 711 are divided into spatial partitions of varying sizes to provide mapping data to vehicles 101 and other end user devices with near real-time speed without overloading the available resources of the vehicles 101 and/or devices (e.g., computational, memory, bandwidth, etc. resources).

In one embodiment, the mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 711.

In one embodiment, the mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 121 in association with the services platform 117 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicles 101 and/or UEs 109) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or a UE 109, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for traffic incident verification via fusion of a location referencing scheme (e.g., TMC specification) and vehicle sensor data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
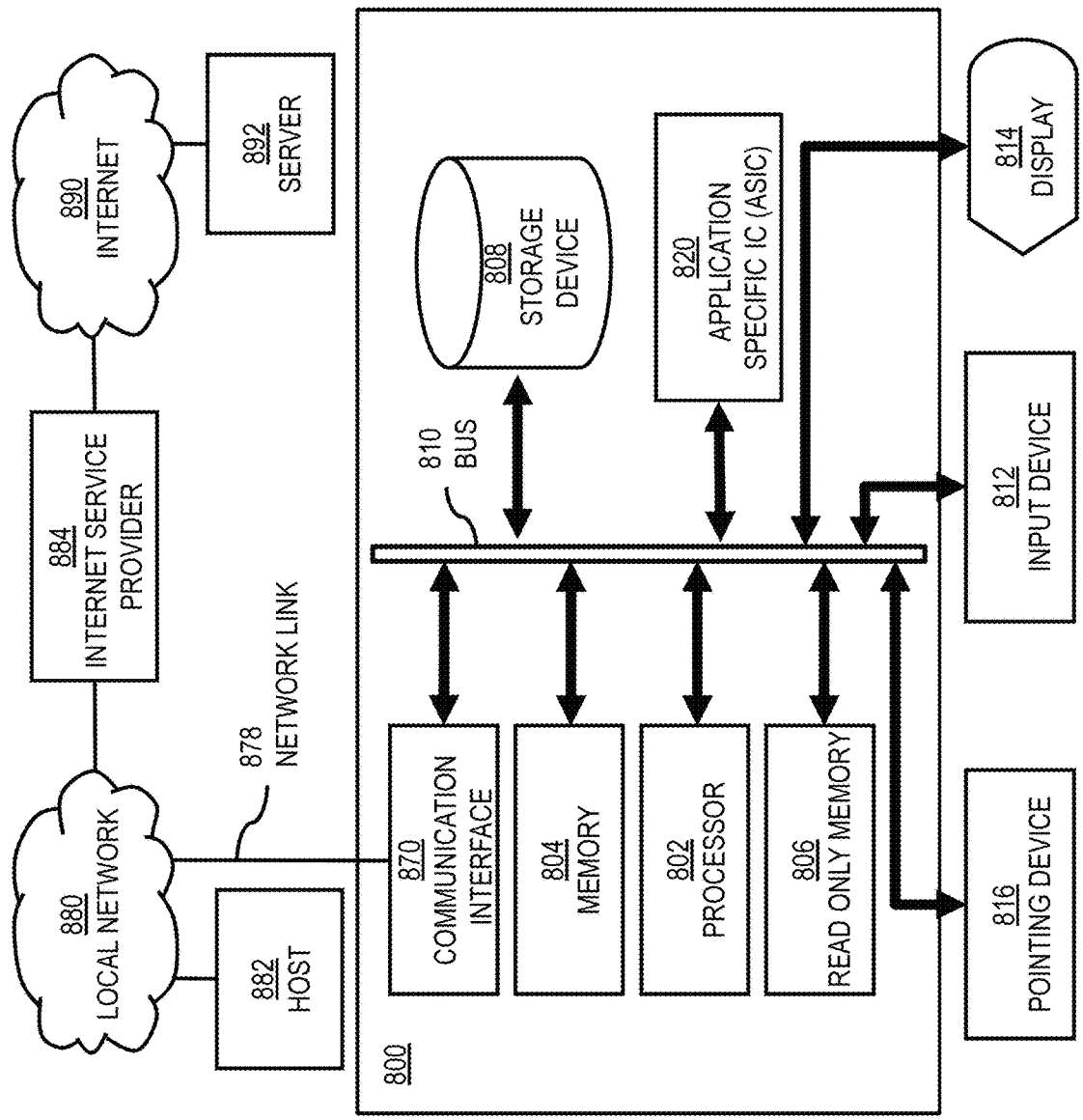
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to provide traffic incident verification via fusion of a location referencing scheme (e.g., TMC specification) and vehicle sensor data as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to traffic incident verification via fusion of a location referencing scheme (e.g., TMC specification) and vehicle sensor data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for traffic incident verification via fusion of a location referencing scheme (e.g., TMC specification) and vehicle sensor data. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for traffic incident verification via fusion of a location referencing scheme (e.g., TMC specification) and vehicle sensor data, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for traffic incident verification via fusion of a location referencing scheme (e.g., TMC specification) and vehicle sensor data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to provide traffic incident verification via fusion of a location referencing scheme (e.g., TMC specification) and vehicle sensor data as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide traffic incident verification via fusion of a location referencing scheme (e.g., TMC specification) and vehicle sensor data. The memory 905 also stores the data associated with or generated by the execution of the inventive steps.

Figure 10:
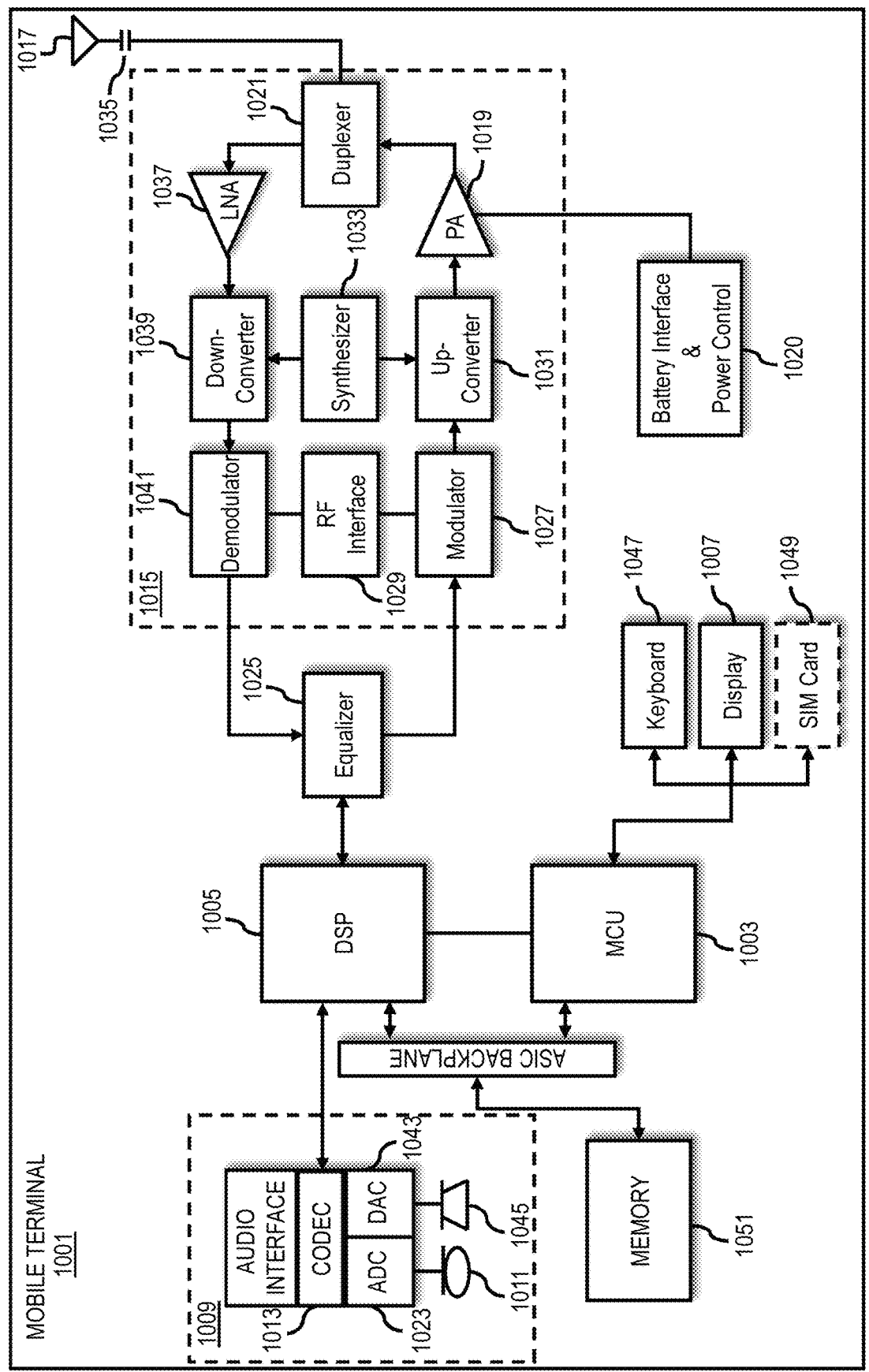
FIG. 10 is a diagram of a mobile terminal (e.g., handset or vehicle or part thereof) that can be used to implement an embodiment.

FIG. 10 is a diagram of exemplary components of a mobile terminal 1001 (e.g., handset or vehicle or part thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide traffic incident verification via fusion of a location referencing scheme (e.g., TMC specification) and vehicle sensor data. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving at least one traffic message channel (TMC) message indicating a traffic incident, wherein the at least one TMC message indicates an extent of the traffic incident in a road graph using one or more TMC location codes and one or more TMC location offsets;
   matching the one or more TMC locations codes and the one or more TMC location offsets to a first set of one or more map road links and one or more link offsets of a geographic database;
   determining sensor data collected from one or more sensors of one or more vehicles travelling within the road graph, wherein the sensor data indicates the extent as one or more location points of one or more topology segments (TSs) and one or more TS offsets;
   matching the one or more location points of the one or more TSs and TS offsets to a second set of one or more map road links and one or more link offsets of the geographic database;
   determining an intersection set between the first and second sets of the one or more map road links;
   initiating a confirmation of the traffic incident reported in the at least one TMC message based on the sensor data of the one or more location points of the one or more TSs in the intersection set; and
   providing the confirmation as an output.

2. The method of claim 1, wherein the at least one TMC message specifies a starting point of the extent based on a first TMC location code and a first offset, and specifies an ending point of the extent based on a second TMC location code and a second offset.

3. The method of claim 2, further comprising:
   determining a chain of TMC location codes spanning from the starting point to the ending point,
   wherein the first set includes one or more additional map road links of the geographic database corresponding to the chain of TMC location codes.

4. The method of claim 3, further comprising:
   extracting a road geometry of the chain; and
   calculating a starting offset and an ending offset of the first set based on the road geometry.

5. The method of claim 1, further comprising:
   processing the one or more location points of the sensor data to build a route corresponding to the extent; and
   splitting the route into the one or more TSs and one or more TS offsets.

6. The method of claim 5, further comprising:
   for each TS of the one or more TSs, computing a probability, a confidence, or a combination thereof of the traffic incident,
   wherein the confirmation of the traffic incident is based on the probability, the confidence, or the combination thereof.

7. The method of claim 1, further comprising:
   initiating a cancellation of the at least one TMC message based on the confirmation indicating that the traffic incident is not confirmed by the sensor data.

8. The method of claim 1, wherein the traffic incident includes a road construction event.

9. An apparatus comprising:
   at least one processor; and
   at least one memory including computer program code for one or more programs,
   the at least one memory and the computer program code configured to, with the at least one processor, cause the apparatus to perform at least the following,
   receive at least one traffic message channel (TMC) message indicating a traffic incident, wherein the at least one TMC message indicates an extent of the traffic incident in a road graph using one or more TMC location codes and one or more TMC location offsets;
   match the one or more TMC locations codes and the one or more TMC location offsets to a first set of one or more map road links and one or more link offsets of a geographic database;
   determine sensor data collected from one or more sensors of one or more vehicles travelling within the road graph, wherein the sensor data indicates the extent as one or more location points of one or more topology segments (TSs) and one or more TS offsets;
   match the one or more location points of the one or more TSs and TS offsets to a second set of one or more map road links and one or more link offsets of the geographic database;
   determine an intersection set between the first and second sets of the one or more map road links;
   initiate a confirmation of the traffic incident reported in the at least one TMC message based on the sensor data of the one or more location points of the one or more TSs in the intersection set; and
   provide the confirmation as an output.

10. The apparatus of claim 9, wherein the at least one TMC message specifies a starting point of the extent based on a first TMC location code and a first offset, and specifies an ending point of the extent based on a second TMC location code and a second offset.

11. The apparatus of claim 10, wherein the apparatus is further caused to perform:
    determine a chain of TMC location codes spanning from the starting point to the ending point,
    wherein the first set includes one or more additional map road links of the geographic database corresponding to the chain of TMC location codes.

12. The apparatus of claim 11, wherein the apparatus is further caused to perform:
    extract a road geometry of the chain; and
    calculate a starting offset and an ending offset of the first set based on the road geometry.

13. The apparatus of claim 9, wherein the apparatus is further caused to perform:
  process the one or more location points of the sensor data to build a route corresponding to the extent; and
  split the route into the one or more TSs and one or more TS offsets.

14. The apparatus of claim 13, wherein the apparatus is further caused to perform:
  for each TS of the one or more TSs, compute a probability, a confidence, or a combination thereof of the traffic incident,
  wherein the confirmation of the traffic incident is based on the probability, the confidence, or the combination thereof.

15. A non-transitory computer readable storage medium including one or more sequences of one or more instructions which, when executed by one or more processors, cause an apparatus to at least perform:
  receiving at least one traffic message channel (TMC) message indicating a traffic incident, wherein the at least one TMC message indicates an extent of the traffic incident in a road graph using one or more TMC location codes and one or more TMC location offsets;
  matching the one or more TMC locations codes and the one or more TMC location offsets to a first set of one or more map road links and one or more link offsets of a geographic database;
  determining sensor data collected from one or more sensors of one or more vehicles travelling within the road graph, wherein the sensor data indicates the extent as one or more location points of one or more topology segments (TSs) and one or more TS offsets;
  matching the one or more location points of the one or more TSs and TS offsets to a second set of one or more map road links and one or more link offsets of the geographic database;
  determining an intersection set between the first and second sets of the one or more map road links;
  initiating a confirmation of the traffic incident reported in the at least one TMC message based on the sensor data of the one or more location points of the one or more TSs in the intersection set; and
  providing the confirmation as an output.

16. The non-transitory computer readable storage medium of claim 15, wherein the at least one TMC message specifies a starting point of the extent based on a first TMC location code and a first offset, and specifies an ending point of the extent based on a second TMC location code and a second offset.

17. The non-transitory computer-readable storage medium of claim 16, wherein the apparatus is caused to further perform:
  determining a chain of TMC location codes spanning from the starting point to the ending point,
  wherein the first set includes one or more additional map road links of the geographic database corresponding to the chain of TMC location codes.

18. The non-transitory computer-readable storage medium of claim 17, wherein the apparatus is caused to further perform:
  extracting a road geometry of the chain; and
  calculating a starting offset and an ending offset of the first set based on the road geometry.

19. The non-transitory computer-readable storage medium of claim 15, wherein the apparatus is caused to further perform:
  processing the one or more location points of the sensor data to build a route corresponding to the extent; and
  splitting the route into the one or more TSs and one or more TS offsets.

20. The non-transitory computer-readable storage medium of claim 19, wherein the apparatus is caused to further perform:
  for each TS of the one or more TSs, computing a probability, a confidence, or a combination thereof of the traffic incident,
  wherein the confirmation of the traffic incident is based on the probability, the confidence, or the combination thereof.

* * * * *